US009673582B2

(12) United States Patent
Guilmette

(10) Patent No.: US 9,673,582 B2
(45) Date of Patent: Jun. 6, 2017

(54) MODULAR HOUSING AND TRACK ASSEMBLIES FOR TUBULAR LAMPS

(71) Applicant: Joseph Guilmette, North Hampton, NH (US)

(72) Inventor: Joseph Guilmette, North Hampton, NH (US)

( * ) Notice: Subject to any disclaimer, the term of this patent is extended or adjusted under 35 U.S.C. 154(b) by 64 days.

(21) Appl. No.: 14/750,460

(22) Filed: Jun. 25, 2015

(65) Prior Publication Data

US 2015/0316238 A1 Nov. 5, 2015

Related U.S. Application Data

(63) Continuation-in-part of application No. 13/743,669, filed on Jan. 17, 2013, now Pat. No. 9,097,411.

(60) Provisional application No. 61/631,973, filed on Jan. 17, 2012.

(51) Int. Cl.

| | |
|---|---|
| ***F21V 15/01*** | (2006.01) |
| ***H02G 3/08*** | (2006.01) |
| ***H01R 25/14*** | (2006.01) |
| ***F21S 2/00*** | (2016.01) |
| ***F21V 21/30*** | (2006.01) |
| ***F21V 21/34*** | (2006.01) |
| ***F21K 9/27*** | (2016.01) |
| *F21V 7/00* | (2006.01) |
| *F21V 7/22* | (2006.01) |
| *F21Y 113/00* | (2016.01) |
| *F21S 8/06* | (2006.01) |
| *F21Y 103/00* | (2016.01) |
| *F21Y 103/10* | (2016.01) |
| *F21Y 115/10* | (2016.01) |

(52) U.S. Cl.

CPC ............... *H01R 25/14* (2013.01); *F21K 9/27* (2016.08); *F21S 2/00* (2013.01); *F21V 21/30* (2013.01); *F21V 21/34* (2013.01); *F21S 8/06* (2013.01); *F21V 7/005* (2013.01); *F21V 7/22* (2013.01); *F21V 15/013* (2013.01); *F21Y 2103/00* (2013.01); *F21Y 2103/10* (2016.08); *F21Y 2113/00* (2013.01); *F21Y 2115/10* (2016.08)

(58) Field of Classification Search

CPC ....... F21V 15/01; F21V 15/013; H02G 3/086; H02G 3/14; B65D 7/12

See application file for complete search history.

(56) References Cited

U.S. PATENT DOCUMENTS

| | | | | | |
|---|---|---|---|---|---|
| 4,729,078 | A * | 3/1988 | Skegin | F21S 8/038 | 362/294 |
| 4,858,087 | A * | 8/1989 | Hartshorn | F21V 15/013 | 362/125 |
| 4,858,088 | A | 8/1989 | Agabekov | | |
| 5,165,048 | A | 11/1992 | Keller | | |
| 5,658,067 | A * | 8/1997 | Engle | F21S 2/00 | 362/219 |
| 5,765,944 | A * | 6/1998 | Fallon | F16L 3/13 | 362/217.1 |
| 5,791,764 | A * | 8/1998 | Jaksich | F21V 15/013 | 362/222 |

(Continued)

*Primary Examiner* — Ismael Negron

(74) *Attorney, Agent, or Firm* — McLane Middleton, Professional Association

(57) ABSTRACT

A lighting system for LED lights, including a plurality of discrete extruded elements interconectable to create various housing, support and light modifiers to be used in luminaire assemblies.

23 Claims, 42 Drawing Sheets

(56) References Cited

U.S. PATENT DOCUMENTS 6,050,700 A * 4/2000 Satterfield ............... F21S 8/031 362/216
6,220,721 B1 * 4/2001 Chan ......................... F21S 2/00 362/219
6,361,186 B1 3/2002 Slayden
7,063,440 B2 * 6/2006 Mohacsi ................... F21S 2/00 362/238
7,182,627 B1 2/2007 Huang
7,287,883 B1 10/2007 Plunk et al.
D592,785 S 5/2009 Bisberg et al.
7,824,056 B2 * 11/2010 Madireddi .............. A47F 3/001 362/125
7,854,527 B2 * 12/2010 Anderson ................. F21V 3/00 362/133
D632,418 S 2/2011 Bisberg et al.
7,959,334 B2 6/2011 Tsai et al.
8,052,301 B2 * 11/2011 Zhou ..................... F21V 15/013 362/249.02
8,083,366 B1 * 12/2011 Backer .................. F21V 33/006 362/145
8,104,920 B2 * 1/2012 Dubord ................... F21S 2/005 362/217.12
8,207,821 B2 6/2012 Roberge et al.
8,210,724 B2 7/2012 Ying
8,337,043 B2 12/2012 Verfuerth et al.
8,425,080 B2 4/2013 Konaka
8,439,517 B2 5/2013 Welker
8,789,966 B2 7/2014 McCanless et al.
8,807,784 B2 8/2014 Marquardt et al.
2006/0146531 A1 7/2006 Reo et al.
2009/0207602 A1 8/2009 Reed et al.
2010/0254146 A1 10/2010 McCanless
2011/0199005 A1 8/2011 Bretschneider et al.
2012/0155073 A1 6/2012 McCanless et al.

* cited by examiner

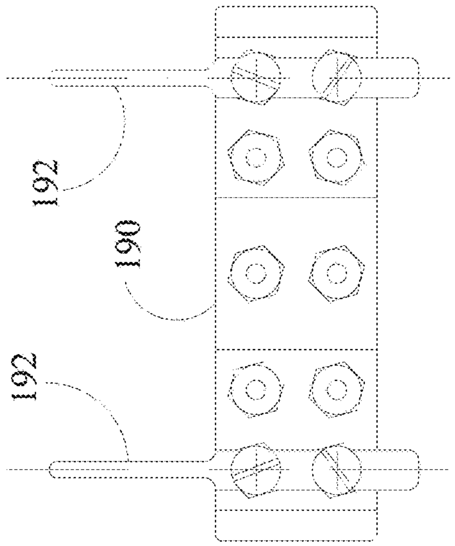
FIG. 15B
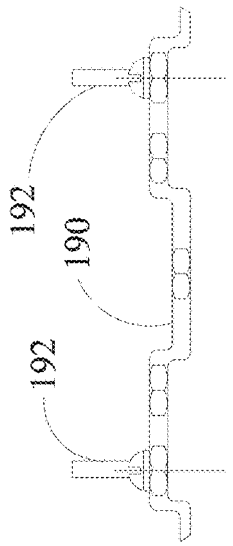
FIG. 15C
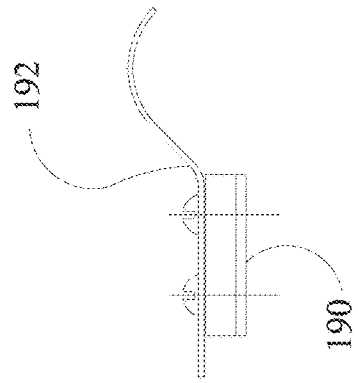
FIG 15. D

MODULAR HOUSING AND TRACK ASSEMBLIES FOR TUBULAR LAMPS

CROSS-REFERENCE TO RELATED APPLICATION(S)

This application is a continuation-in-part of U.S. application Ser. No. 13/743,669 filed Jan. 17, 1013, now U.S. Pat. No. 9,097,411, which in turn claims the benefit of priority of U.S. provisional application No. 61/631,973, filed Jan. 17, 2012. Each of the aforementioned applications is incorporated by reference in its entirety.

BACKGROUND

The present invention is generally directed to a modular lighting system and, more particularly, to a lighting system employing a multiple-mode, integrated track fixture. Although the present development will be show and described herein by way of reference to LED lighting elements, including flexible LED strips and/or for high efficiency tubular LED lamps, it will be recognized that the modular rail system herein may also be adapted for use with conventional fluorescent tubes.

A major effort in LED lighting is the development of replacement lamps for the fluorescent tube, which is in common use in industrial and commercial applications. An accepted direction of the technology is to directly replace the fluorescent lamp in its existing fixture with a mechanically equivalent LED equivalent tube which requires no modification of the mounting fixture. However, many applications including new construction require completely new lighting systems such as the ones described in this disclosure.

It has been determined that the LED requires less than 25% of the input power required by conventional non-fluorescent light sources and 50% less than fluorescent light sources. This reduced power requirement allows a significant increase in the number of lamps that can be accommodated on a single branch circuit. For example, assuming a power demand of 15 watts/lamp, as many as 100 lamps could be wired to a single 120V AC, 15 amp branch circuit.

Accordingly, the present disclosure contemplates a new and improved LED lighting system which can take advantage of such reduced power requirements.

SUMMARY

High bay installations frequently require a long string of fixtures wired to one parallel branch circuit. The present disclosure describes a system for connecting assemblies together thus creating a long linear array of fixtures using elongate beams or rails and connector sleeves. The initial hanging point is located at the end of the first assembly. A second hanging point may be used to support a single assembly or, in the event of multiple assemblies, the hanging point may be at the center of the subsequent connector sleeves. This hanging configuration may be repeated multiple times until reaching the last assembly. Assemblies are joined together using welded connections, lock pins or similar device, or a combination of welded joints and removable fasteners to link the assemblies to the connector sleeve. The last assembly may hang from a mounting point at the end its support beam.

Once the pre wired assemblies are located in the building, the only requirement for electrical connections is to plug the first assembly into a wall outlet and subsequent assemblies may be plugged into the preceding assembly's outlet at the junction box, up to the power limits of the electrical equipment.

One advantage of the mounting system herein is that each sub fixture can be independently mounted and connected. A continuous lighting array is not required and the sub fixtures may be substituted with other devices or left blank. These devices may be designed into a chassis that simulates the strip fixture thus can be integrated anywhere into the system thus providing a modular type installation. Some of the devices that may be mounted using the system herein include but are not limited to:

1 One or more spot or flood lights for emphasis at a particular location;

2. Sound system components (e.g., loudspeakers);

3. Security system components (motion detectors or cameras);

4. Safety system (fire detection equipment, carbon monoxide or other hazard detector equipment, alarms);

5. Accent lighting;

6. Thermal sensing devices for HVAC systems;

7. Computer network equipment such as a Wi-Fi router or extender, or the like.

If required, wiring between these devices is easily accomplished within the system using the existing wiring paths within the structures. All wiring between these devices can be completed internally from any point to another in the system, thus virtually eliminating external wiring and unsightly wires.

One advantage of the present invention resides in its ability to eliminate the need for on-site wiring for the various modes of operation.

Still further advantages and benefits of the present development will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

FIG. 7 is a cross-sectional view illustrated the manner of attaching a spotlight, flood light, accent light, or the like.

FIGS. 15B-15D are top, front, and side views, respectively, of the exemplary terminal block and brush connector system appearing in FIG. 15A.

DETAILED DESCRIPTION OF THE PREFERRED EMBODIMENTS

The present development takes advantage of the reduced power requirements by providing a method to engage and interconnect multiple LED lamp fixtures onto a track/rail beam with optional spacing between them. This track/rail beam and also is designed to function as a wiring troth and is dimensioned to accept commonly available electrical hardware such as junction boxes and outlets. This concept permits factory pre wiring prior to installation at the construction site thus enabling considerable cost savings when compared to conventional building wiring. The fixture assemblies are installed in the high bay building using chains or cables suspended from the roof structure at predetermined points. An alternate mounting method is presented which is especially suited for wood beam structures using swivel brackets.

For larger installations requiring a long string of lamps, a method of connecting track/rail beams using a connector sleeve permits connections using only quick release pins for fastening sections. This is especially useful for temporary lighting requirements since the sections are readily disassembled by removing the quick disconnect pins and sliding the sections apart. Electrical connections are conveniently made with receptacles and power cords provided with each assembly. The first assembly is connected to a switched outlet and subsequent assemblies connected to the one in front of it up to the safe limit of the electrical load.

The lighting system track/rail features a universal mounting method for various electrical devices resulting in multiple modes of operation. The most basic operational mode is the use of LED strips inserted into slots in the lower surface of the track/rail. A second operational mode is achieved with the use of LED tube fixtures while a third mode is realized which features a method of mounting discrete components into the system taking advantage of electrical power conveniently available in the rail. A fourth mode, bidirectional, shows the system configured to emit light both upward and downward simultaneously from separate light sources that can be independently controlled.

Figure 1A:
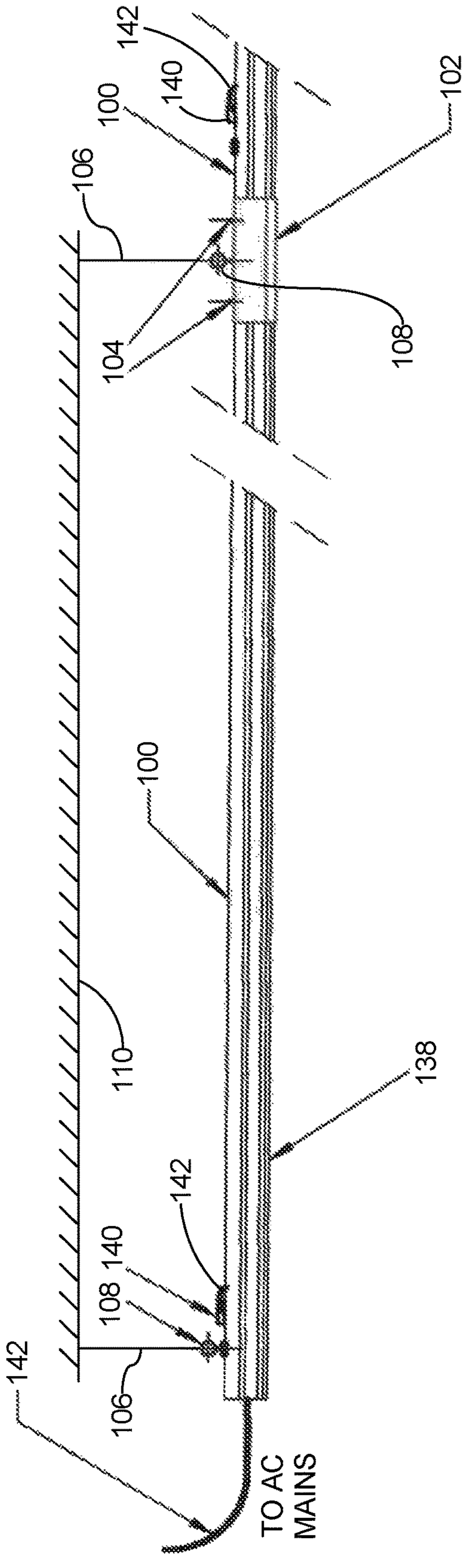
FIG. 1A is a side view of an exemplary light bar embodiment.
Figure 1B:
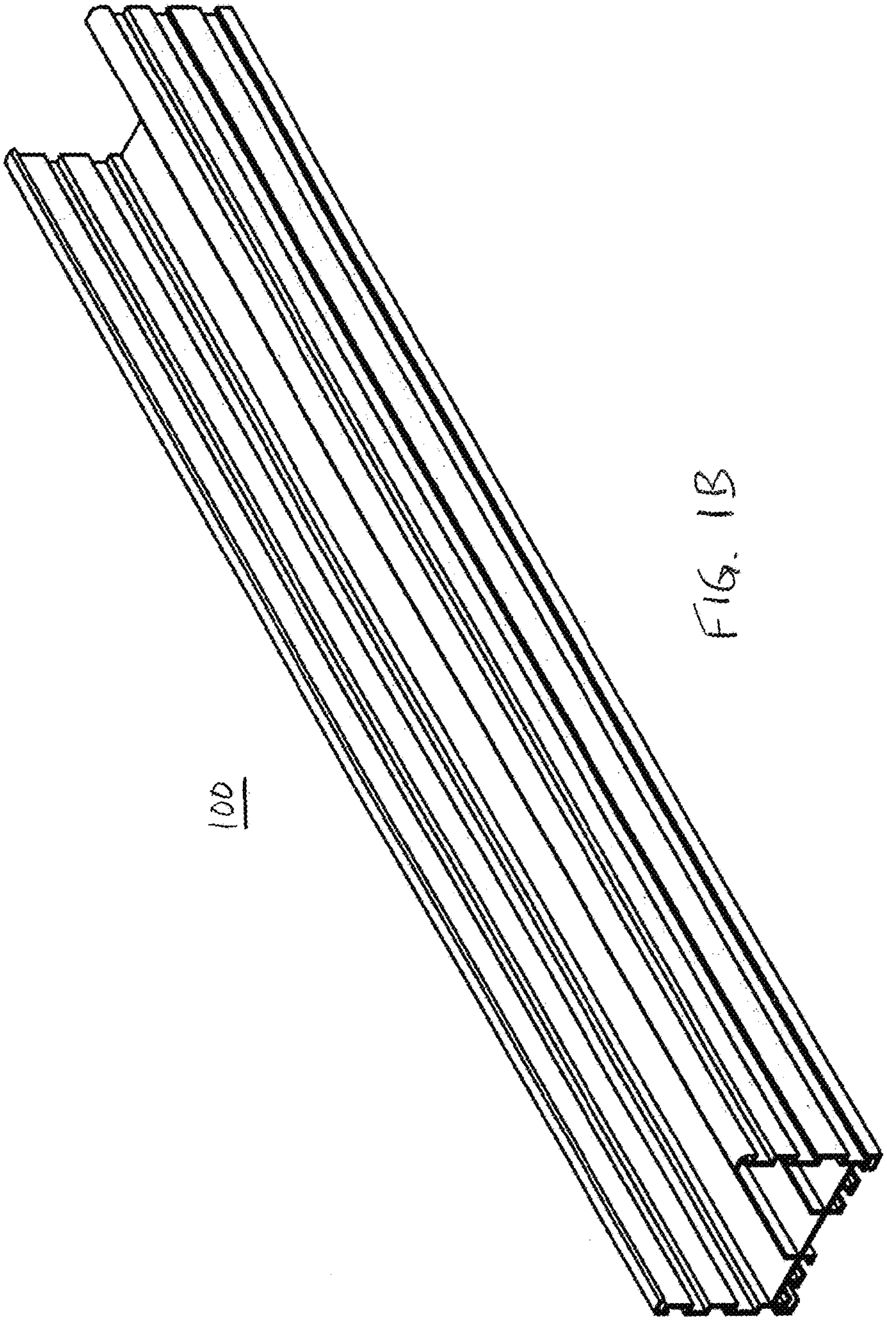
FIG. 1B is an isometric view of the main rail or beam appearing in FIG. 1A.
Figures 1C, 1D:
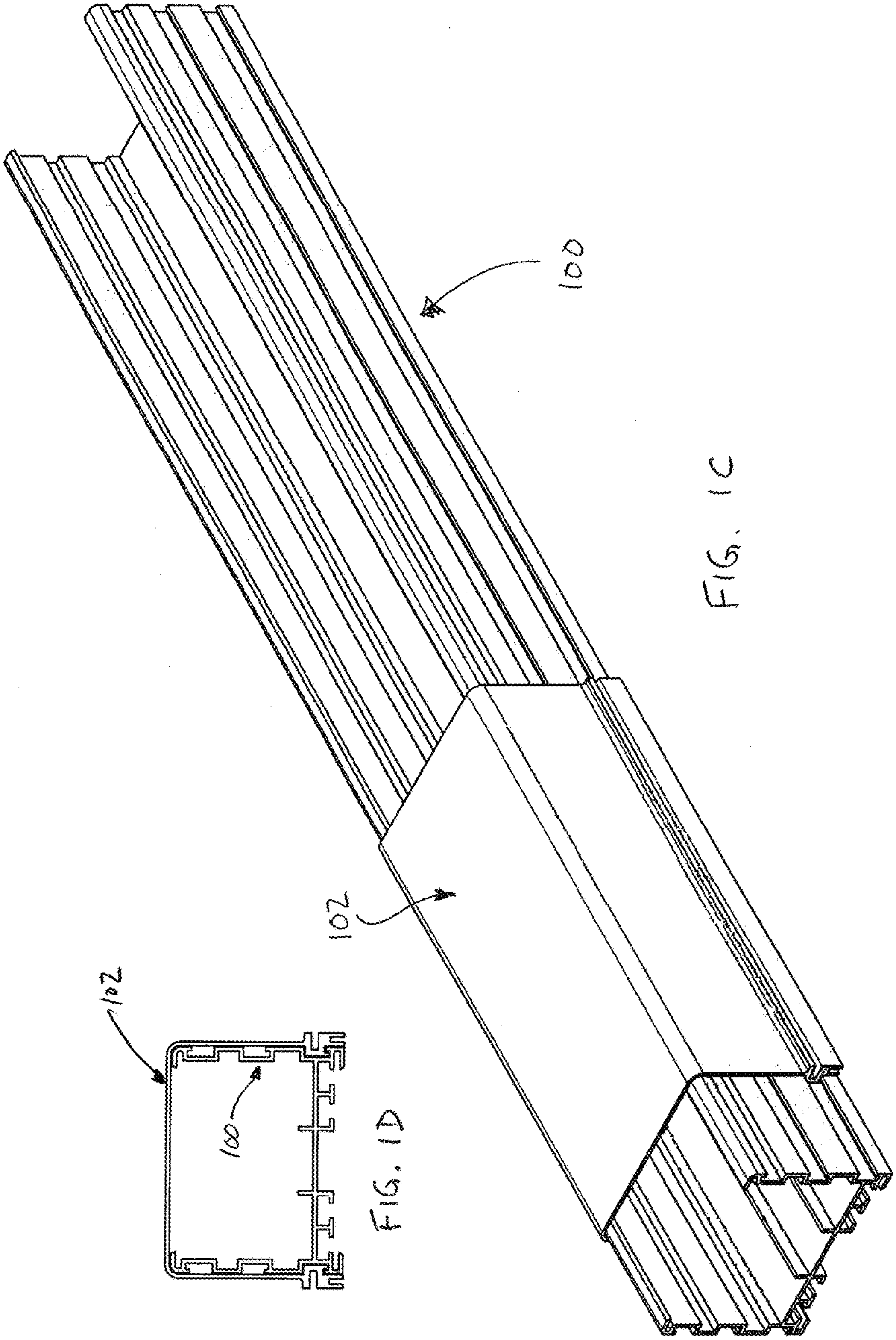
FIGS. 1C and 1D are isometric and cross-sectional views, respectively, of a rail and connector sleeve in accordance with an exemplary embodiment.
Figure 1E:
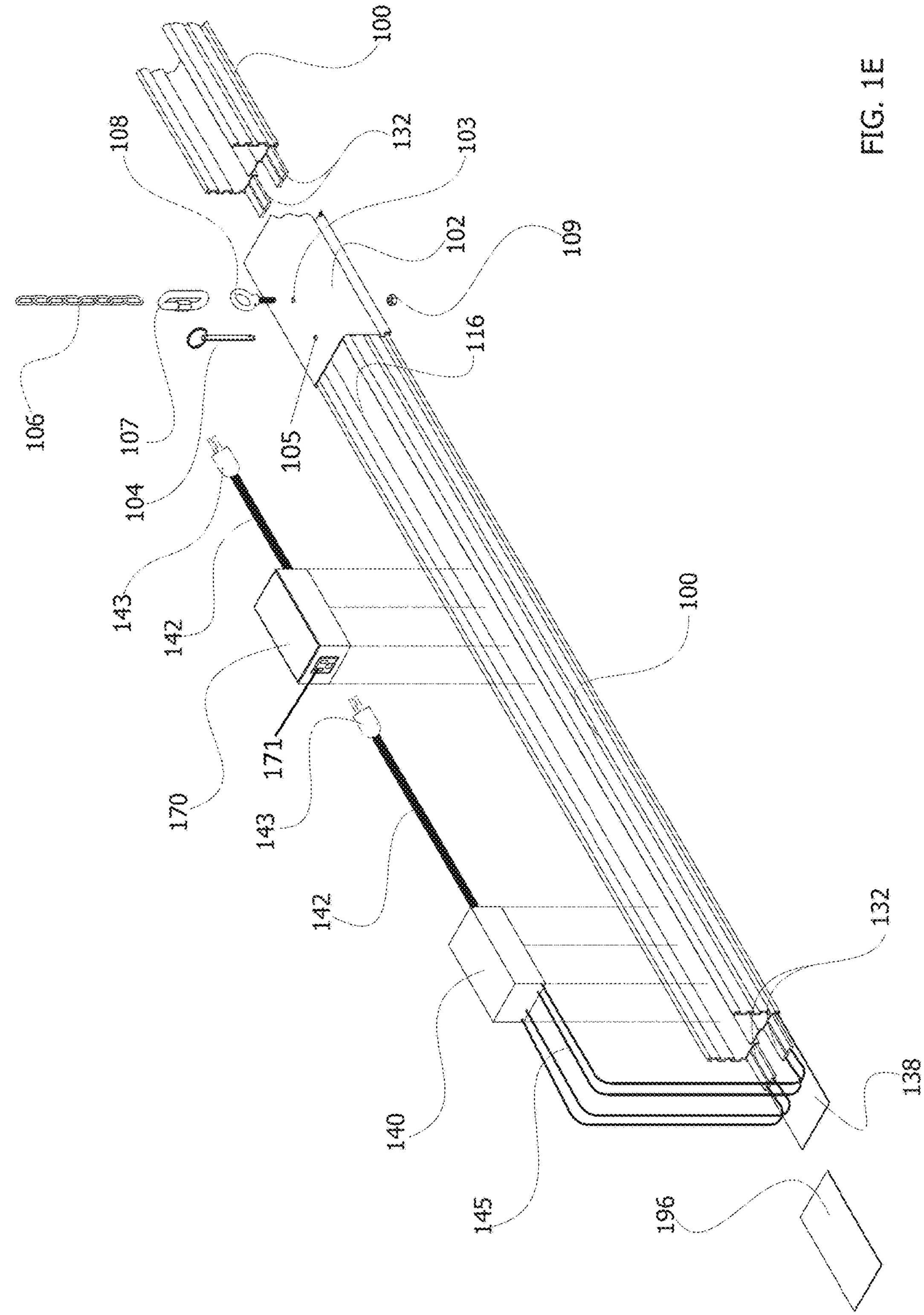
FIG. 1E is a partially exploded view of the embodiment appearing in FIG. 1A.

With reference to FIGS. 1A and 1E, there appears a basic layout of the multi light fixture herein in what is referred to herein as the light bar mode. The primary structural component is the track/rail beam 100, designed to accommodate all operational modes described in this disclosure. An isometric view of the beam 100 appears in FIG. 1B. A cross-sectional view of the beam 100 appears in FIG. 9.

Figure 9:
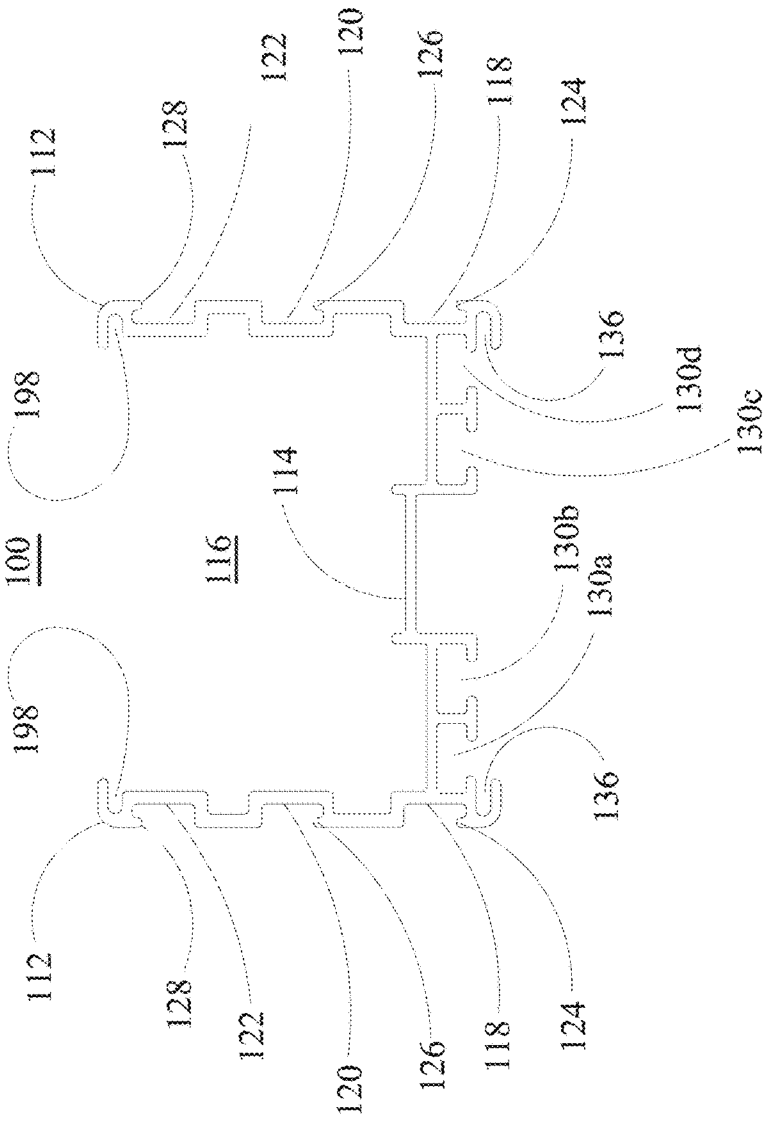
FIG. 9 is an enlarged cross-sectional view of an exemplary main rail member.

FIG. 9 reveals a cross section view of the beam 100 which is common to all modes of operation. An open beam concept provides a cavity or channel 116 for installing junction boxes, transformers, power supplies, etc., as well as providing a wire trough for connecting wiring. Three sets of tracks or channels (118, 120, 122) along the vertical or upstanding sidewalls 112 allow the beam 100 to accommodate each of the modes of operation described in this disclosure. Each track features a locking tab (124, 126, 128, respectively) that prevents the structures mounted on the beam to spread outward and become disconnected from the beam, e.g., in the event of an unexpected high external load. Four slots (130*a*-130*d*) for installing LED lighting strips are provided on the horizontal base 114. Several exemplary configurations of the beam 100 and connector sleeve 102 for adjoining adjacent beams are shown in FIGS. 16A-16D.

The preferred method of fabricating the beam 100 is an aluminum extrusion, which allows the use of long lengths, which are contemplated by the present development. In preferred embodiments, the beam 100 has a length of up to about 5.5 meters (18 feet) for a single assembly, although longer or shorter lengths are also contemplated. Many applications may require lengths longer than 5.5 meters, which may be accomplished by using a connector sleeve 102 and fasteners 104, such as quick release pins, to lock multiple assemblies together. In alternative embodiments, one of the fasteners 104 could be replaced with a permanent fastener, such as a welded connection or the like.

An enlarged isometric view of a beam 100 having a connector sleeve 102 thereon appears in FIG. 1C. A cross sectional view of the beam 100 and connector sleeve 102 appears in FIG. 1D. The sleeve 102 may be an extruded member. The shape of the connector sleeve 102 closely follows the contour of the outer surface of the beam 100.

The exemplary embodiment of FIGS. 1A and 1E shows one method of supporting the lighting assemblies of the present disclosure in a building structure using cables or chains 106 having a first end fastened to an eyebolt or similar fastener 108 and a second end secured to an overhead structure 110, such as ceiling, beam, etc. The assembly may be supported at each end, as well as at intermediate positions therebetween, such as at each connector sleeve 102 securing adjacent beams 100. The fastener 108, which is an eyebolt in the illustrated embodiment, includes a threaded end which passes through opening 103 in the connector sleeve 102 and may be secured with a threaded nut 109. Alternative methods for securing the lighting assembly herein to an overhead structure are described below.

The beam 100 is an elongate member including opposing, parallel upstanding sidewalls 112 and a horizontal base 114 extending therebetween to define a channel 116. In the illustrated embodiment, each of the sidewalls includes a lower track 118, a center track 120, and an upper track 122. The relative terms "upper" and "lower" refer to the orientation shown in FIGS. 1A-1E, wherein the unit is adapted for use in connection with a down lighting application, although it will be recognized that the unit could be used in other orientations, such as inverted for inverted of diffuse lighting applications.

The tracks or channels 118, 120, and 122 each include a respective locking tab 124, 126, and 128, thereby defining a generally "L"-shaped channel. In alternative embodiments, each track or channel 118, 120, and 122 could include two locking tabs to define a generally "T"-shaped channel.

The base 114 of the beam 100 consists of one or more generally "T"-shaped slots 130*a*, 130*b*, 130*c*, and 130*d*. Four T-shaped slots are shown in the illustrated preferred embodiment, although other numbers of slots are also contemplated. The slots 130*a*-130*d* are dimensioned to receive LED strips 132, which are slidingly received in the slots and extend along the length of the beam 100 (see, e.g., FIGS. 1E and 3). The LED strips may be of the type containing a flexible circuit board or substrate encapsulated in a transparent or translucent polymeric resin and having a plurality of LED elements spaced along its length. The internal cavity or channel 116 of the beam 100 is dimensioned to accept a DC power supply 140 to power the LED strips 132. The open beam design illustrated herein is preferred as it permits easy access to wiring.

A junction box 170 is also received within the channel 116 and included a cord 142 having a standard AC plug 143. One or more AC outlets or sockets 171 may also be provided on the junction box 170. The power supply 140 includes a power cord 142 with plug 143 for connection to the AC outlet or socket 171 on the junction box 170. The junction box 170 is electrically coupled to an AC power supply, such as a standard AC outlet of the building or structure in which the unit is installed, either directly or via one or more like junction boxes in adjacent attached segments, for example, wherein multiple units are adjoined using connector sleeves 102.

The power supply 140 includes transformer/rectifier circuitry 144 for providing a direct current (e.g., 12 volt) output to the LED strips 132, via lead wires 145. In this manner, any number of lighting units may be connected, up to the amperage limits of the AC circuit. A cover 196 is slidably received within parallel channels 198 (see FIG. 9) on the sidewalls 112 to enclose the wiring and electronics.

A significant advantage of the lighting system presented in this disclosure resides in the ability to interconnect assemblies without the use of building hard wiring once the first assembly has been plugged into a switched outlet. Subsequent assemblies may then be plugged into to the assembly ahead of it in an AC outlet or socket 171 provided in the junction box located on the channel 116. The power cord 142 must of sufficient current capacity to handle the full current load of all assemblies in the branch circuit.

The connector sleeve 102 may be permanently attached, e.g., via welding at one end to a first beam 100 in overhanging fashion, such that the overhanging portion of the sleeve 102 can be removably secured to another beam 100 with a removable fastener 104. Alternatively, the connector sleeve 102 could be removably secured at each end to adjacent beams 100 (see FIG. 1A).

Figure 2:
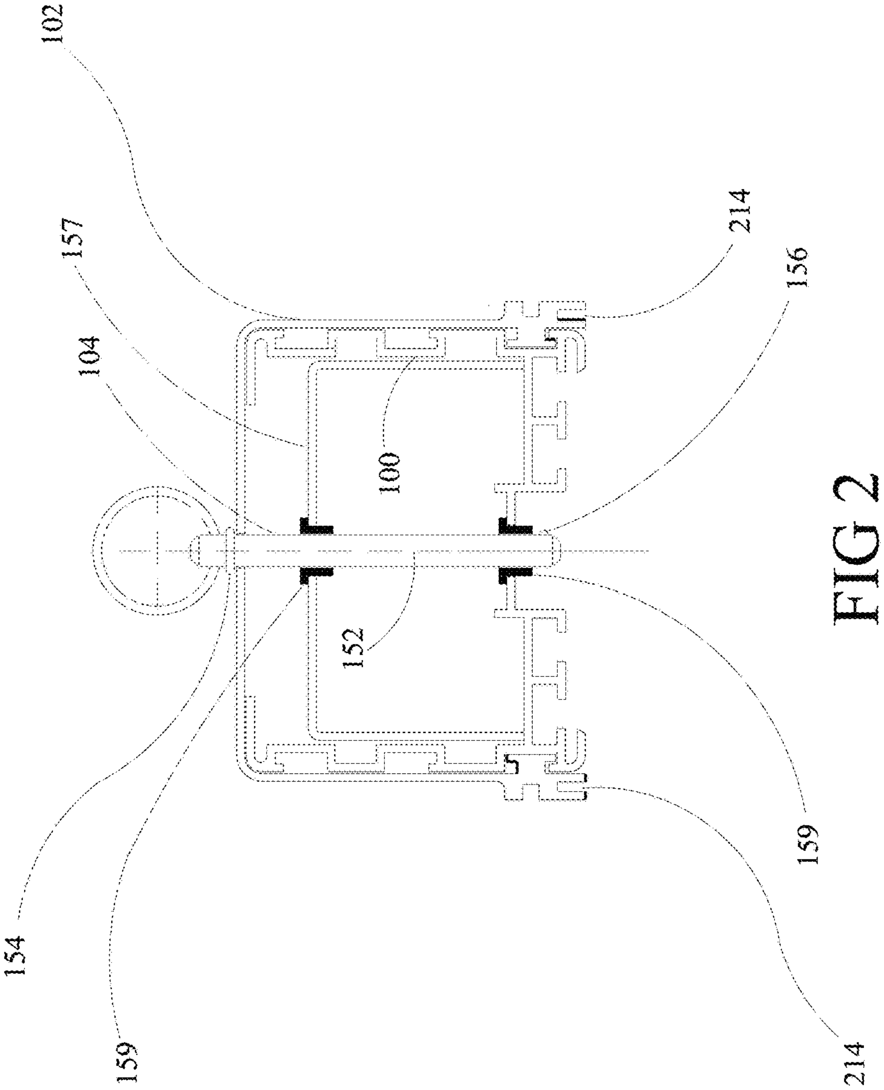
FIG. 2 is a cross-sectional view illustrating the method of removable attachment of the beam to the connector sleeve.

The preferred method of removably attachment between the connector sleeve 102 and a beam 100 is best seen in FIG. 2. The beam member 100 may be secured to the connector sleeve 102 using a fastener 104 passing through an opening 105 in the connector sleeve 102 and a flanged bearing 159 received in a vertically aligned opening in an inverted generally U-shaped bracket 157, and passing through a second vertically aligned flanged bearing 159 received in a vertically aligned opening in the horizontal base 114 of the rail 100. The pin 104 removably secures the connector sleeve 102 and the rail member 100 in fixed relative position. Preferably, the fastener 104 is a quick release pin, e.g., of the type having a shaft 152 with an enlarged diameter portion 154 at one end and a resilient spring biased retaining ball 156 at its opposite end. It will be recognized that other fasteners types such as threaded fasteners, clips, and so forth.

Figure 3:
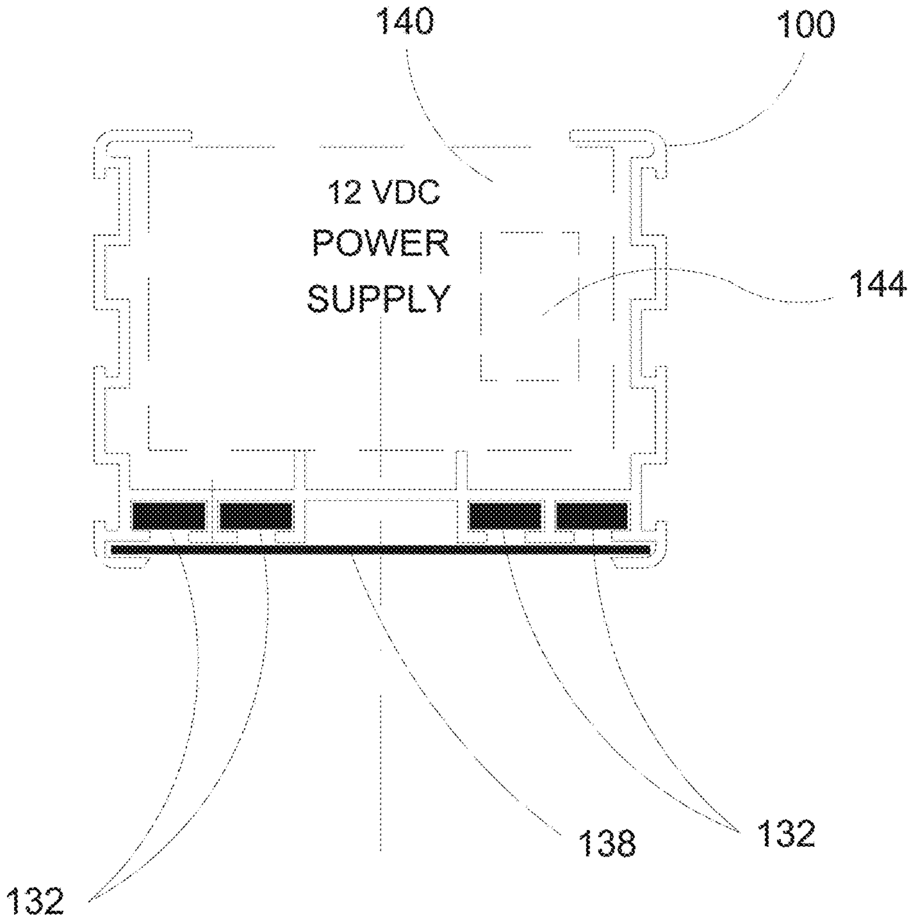
FIG. 3 is a cross-sectional view of the embodiment appearing in FIG. 1A.

Referring now to FIG. 3, and with continued reference to FIGS. 1A-1E and FIG. 9, the exemplary rail 100 also includes slots or channels 136 for slidably receiving a light diffuser below the lighted strips. A variety of diffusers may be employed, including but not limited to flat transparent or translucent panels, patterned sheets, egg crate type diffusers, perforated diffusers, and the like. A panel-type diffuser 138 appears in FIG. 3. Alternatively, for example, an egg crate diffuser having parallel flanges for sliding engagement with the slots or channels 136 may be employed.

LED lighting strips 132 are available with densities of up to 120 LED/meter, requiring a power input of 12 watts/meter. This input is approximately the same as the power input requirements of LED T8 fluorescent lamps. Assuming the same lighting efficiency for each application, the LED unit herein operating in the light bar mode as illustrated in FIGS. 1A and 3 is capable of as much light output as a four tube wide fluorescent fixture at a much reduced cost and size. One drawback of the LED strips 132 is that they are typically not dimmable and typically only operate at one color temperature. This is not the case with new developments related to some new tube type LED lamps.

Referring now to FIGS. 4 and 5A-5C, there is shown a second, tube lamp mode of operation of the lighting apparatus herein. The tube lamps are preferably LED lighting tubes, although the use of fluorescent tube lamps, including conventional fluorescent tubes or high efficiency fluorescent tubes, is also contemplated.

Figure 4:
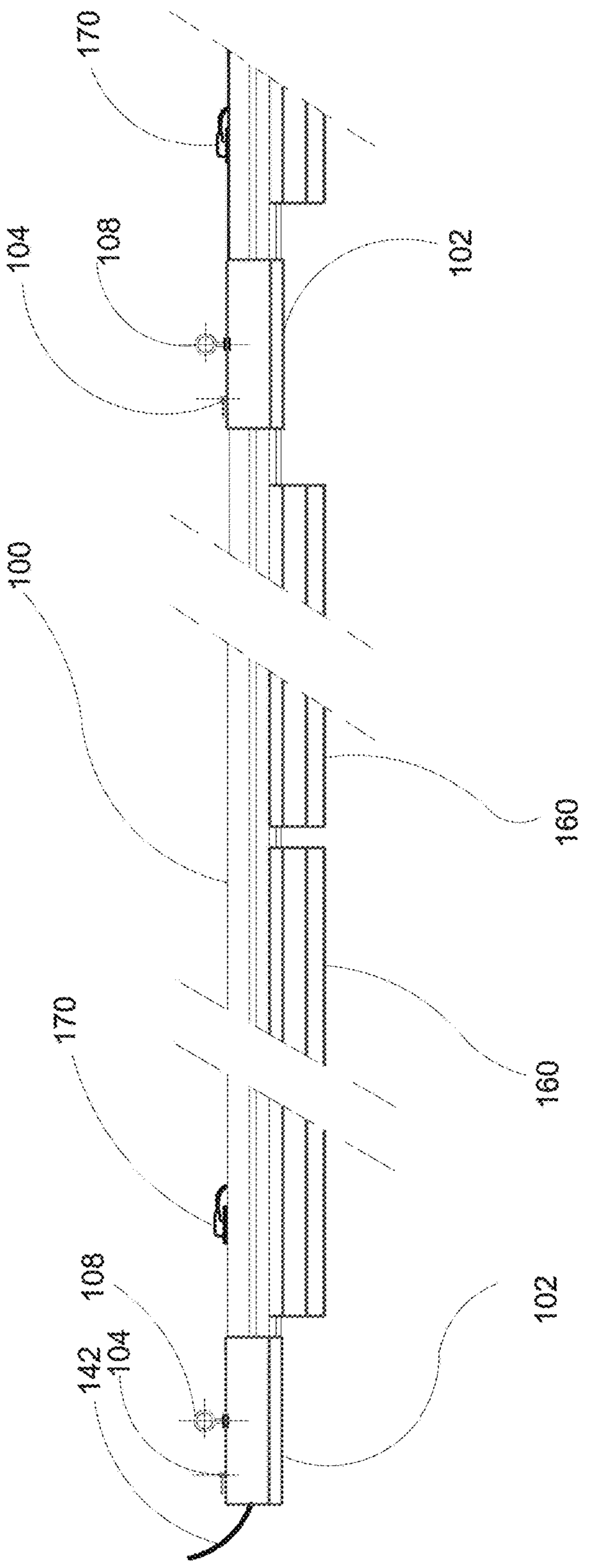
FIG. 4 is a side view of an exemplary tube lamp embodiment therein.

FIG. 4 shows an assembly layout of the tube lamp mode wherein multiple assemblies may be connected using a connector sleeve 102 with fasteners 104 coupling adjacent units in a manner similar to the connection methods described above by way of reference to the light bar mode appearing in FIGS. 1A-1E, with like reference numerals referring to like components.

In the tube lamp mode, the LED strips and 12V DC power supply are omitted from the rail 100. Depending on the length of the rail 100, one or more LED tube subassemblies 160 may be slidingly attached to the rail 100. The LED tube subassembly 160 includes an elongate light reflector 162, which may be a one-piece extruded member, and which also functions as a mounting chassis for LED lighting tubes 164, as shown on FIG. 5A.

Figure 5A:
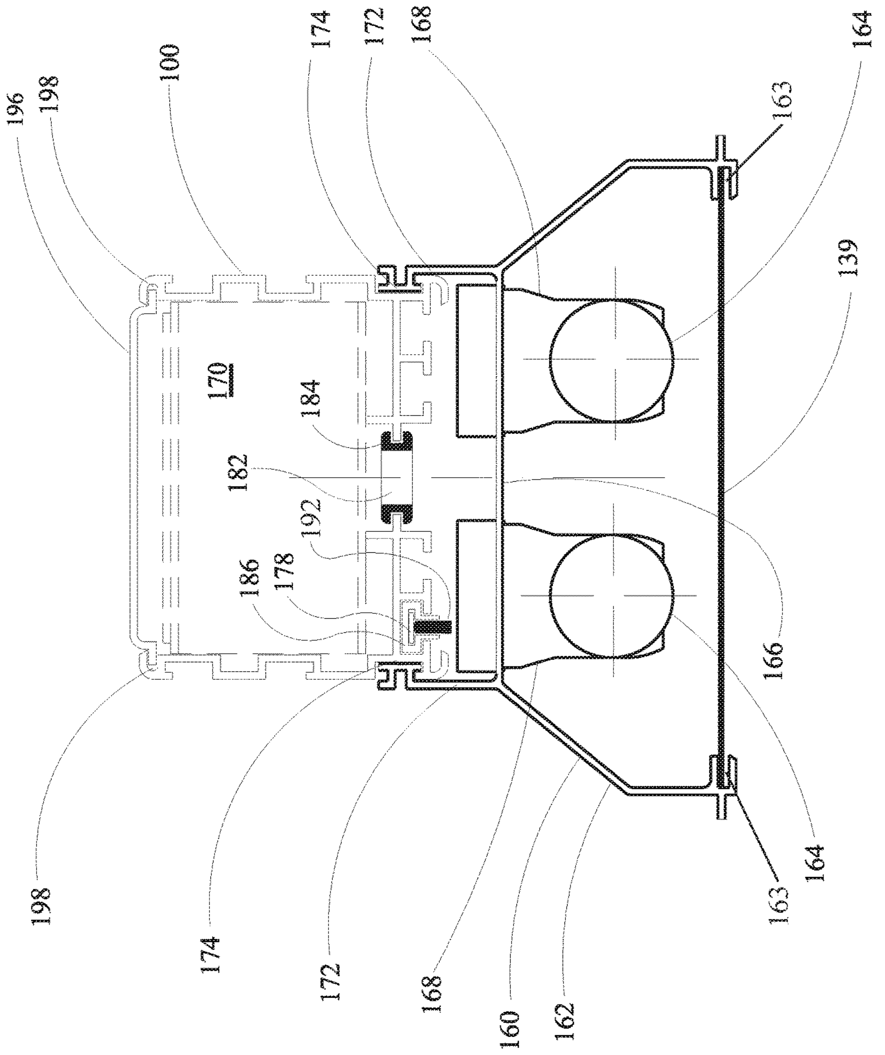
FIG. 5A is a cross-sectional view of the embodiment appearing in FIG. 4.

As best seen in FIG. 5A, the light reflector 162 includes a transverse portion 166 having tube sockets 168 mounted thereon. The LED tube assemblies 160 are wired on the reflector 162 prior to installation onto the beam 100. The tube sockets 168 are located in punched or machined holes formed in the transverse surface 166 and then wired in parallel for 110 V AC operation. The tube subassemblies 160 are slid onto the beam 100 with input power leads fed thru a grommet 184 (see FIG. 5A) to the junction box 170. Alternatively, lead wires can be run along the rail channel 116 and around the end of the rail 100.

The tube sockets may be a commercially available bi-pin socket, such as such as Leviton socket #13351. The tube sockets 168 allow the LED lighting tubes 164 to be mechanically and removably secured to the reflector subassembly 160 and may provide mechanical attachment in a manner similar to conventional fluorescent tubes. The sockets 168 also provide an electrical connection to a power supply, such as the AC mains of the building or structure in which the unit is installed. Electrical contacts on the sockets 168 are electrically coupled to an electrical junction box 170 received in the channel 116 of the rail member 100. The junction box 170 includes a power cord 142 for electrical connection to a wall outlet or the junction box of an adjacent beam member 100, as the case may be. The tube sockets 168 are mounted into the reflector 162 by fastening them into rectangular holes formed in the transverse portion 166.

The reflector 162 includes opposing, upstanding sidewalls 172 having inward facing rails 174 which are complimentary with the tracks or channels 118 on the beam 100. In the illustrated embodiment, the rails 174 are generally T-shaped in cross-section to provide a secure connection by interlocking with the locking tab 124. The reflector 162 structure may be fabricated as an aluminum extrusion, molded or extruded plastic, etc. Plastic is the preferred material due to its high impact resistance, low weight, and finish characteristics. It will be recognized that the reflector 162 may have other cross-sectional shapes including curved, parabolic, etc. The interior surface may be coated with a metal or other reflective material.

Figure 5B:
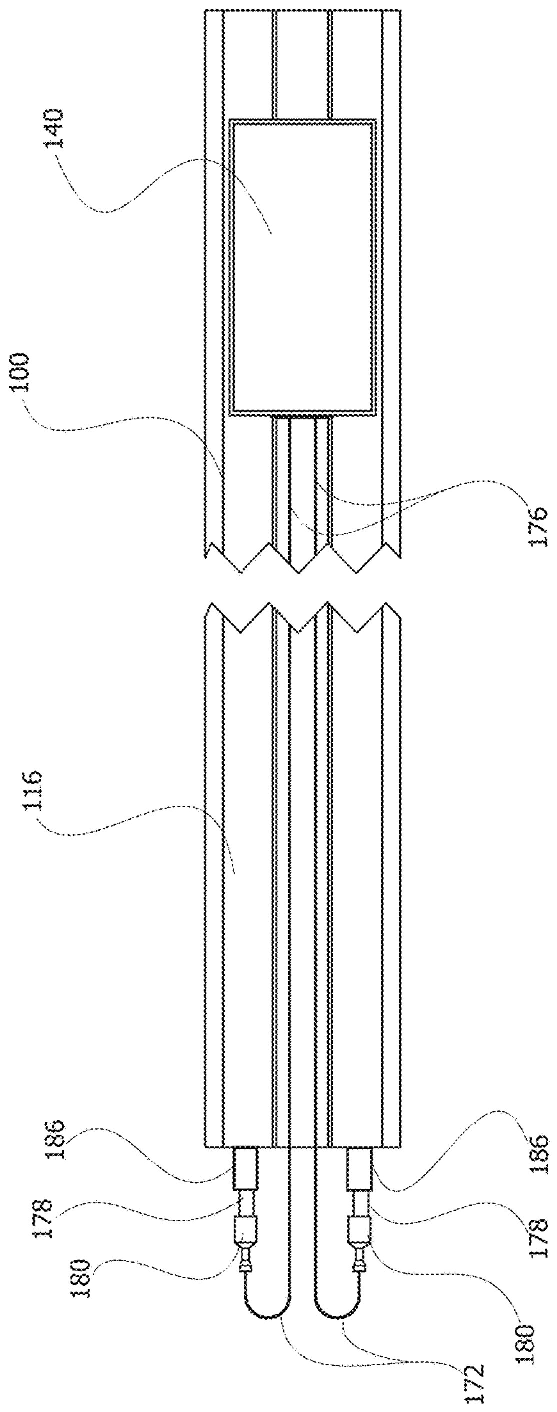
FIG. 5B illustrates an exemplary manner of electrically coupling flat conductors to a junction box.
Figure 5C:
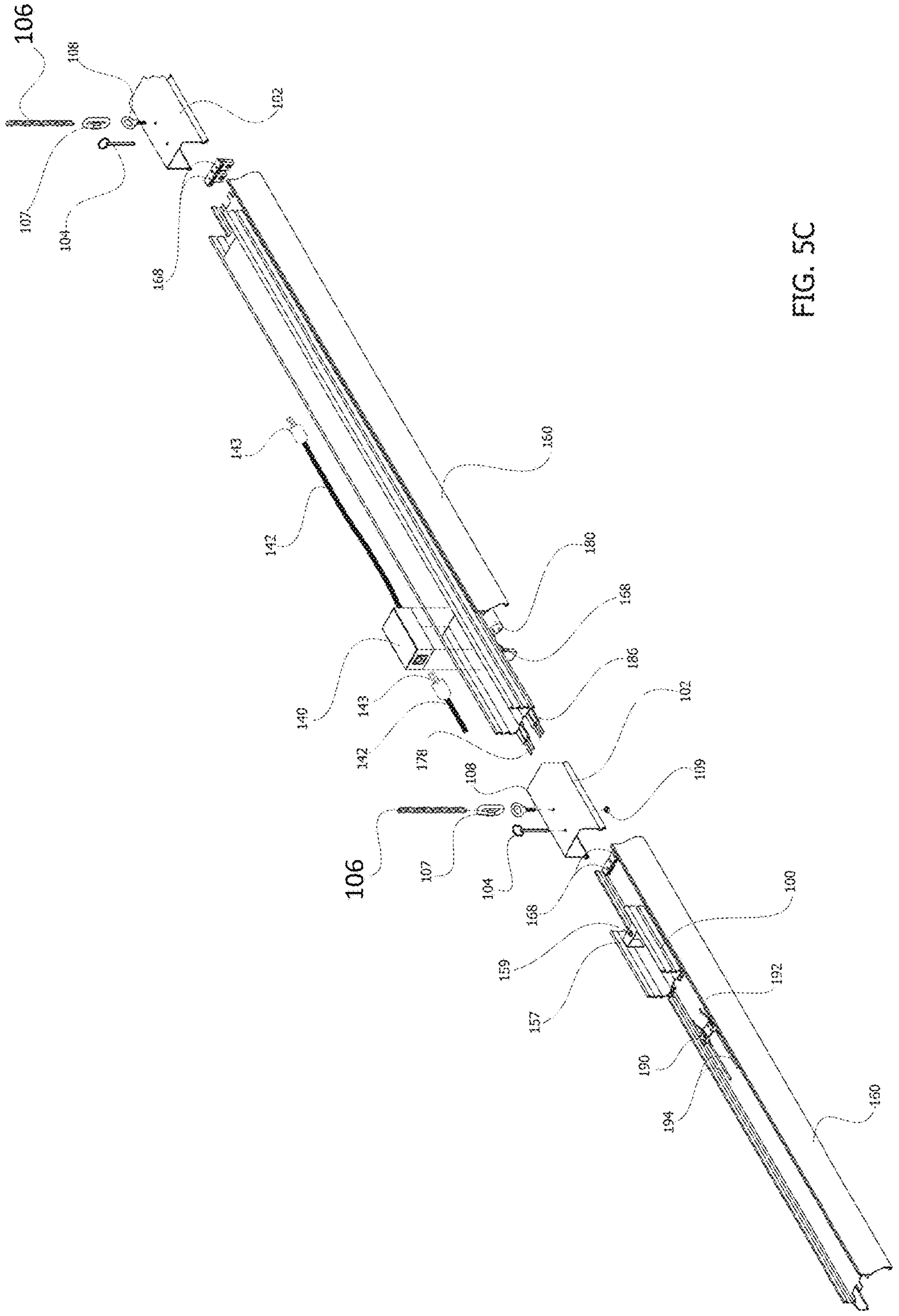
FIG. 5C is a partially exploded isometric view of an exemplary lamp mode embodiment herein.

The present development is advantageous in that wiring operations may be performed prior to installation of the reflector assembly 160 onto the rail member 100. Power from the AC mains of the building or structure is provided to the junction box 170 via the cord 142. As best seen in FIGS. 5B and 5C, a pair of lead wires 176 (e.g., 18 AWG round insulated wire) extend from the junction box 108 along the channel 116. Each of the lead wires 176 is electrically coupled to a corresponding flat conductor 178, e.g., using a terminal connector 180. The lead wires may pass through an opening 182 formed in the horizontal base 114 and grommet 184 provided for this purpose (see FIG. 5A).

Each of the flat conductors 178 runs in a respective one of the axially-extending channels 130*a*-130*d*. The flat conductor 178 is received within an insulating sleeve 186 having a downward-facing, axially-extending opening. An electrical contact block 190 is secured to the upper facing surface of the transverse section of the transverse member 166 of the reflector 162. Electrical contacts 192, such as brush contacts, spring contacts, or the like, are secured to the contact block 190. A pair of lamp socket lead wires 194 are each attached at one end to the contact block 190 and at the other end to an appropriate terminal of one of the tube sockets 168. In operation, the brush or spring contacts 192 extend through the axially-extending opening in the insulating sleeve 186 to bear against the flat conductor 178 to thereby provide an electrical connection between the flat conductors 178 and the respective terminal of the lamp socket 168.

The lower portion of the reflector 162 includes a pair of opposing axially-extending slots 163 for receiving a diffuser panel 139 or other light diffuser including egg crate and others as described above. An elongate plastic cover 196 may likewise be received in the opposing, axially-extending slots 198 formed at the upper end of the upstanding sidewalls 112 of the beam 100.

Figure 6:
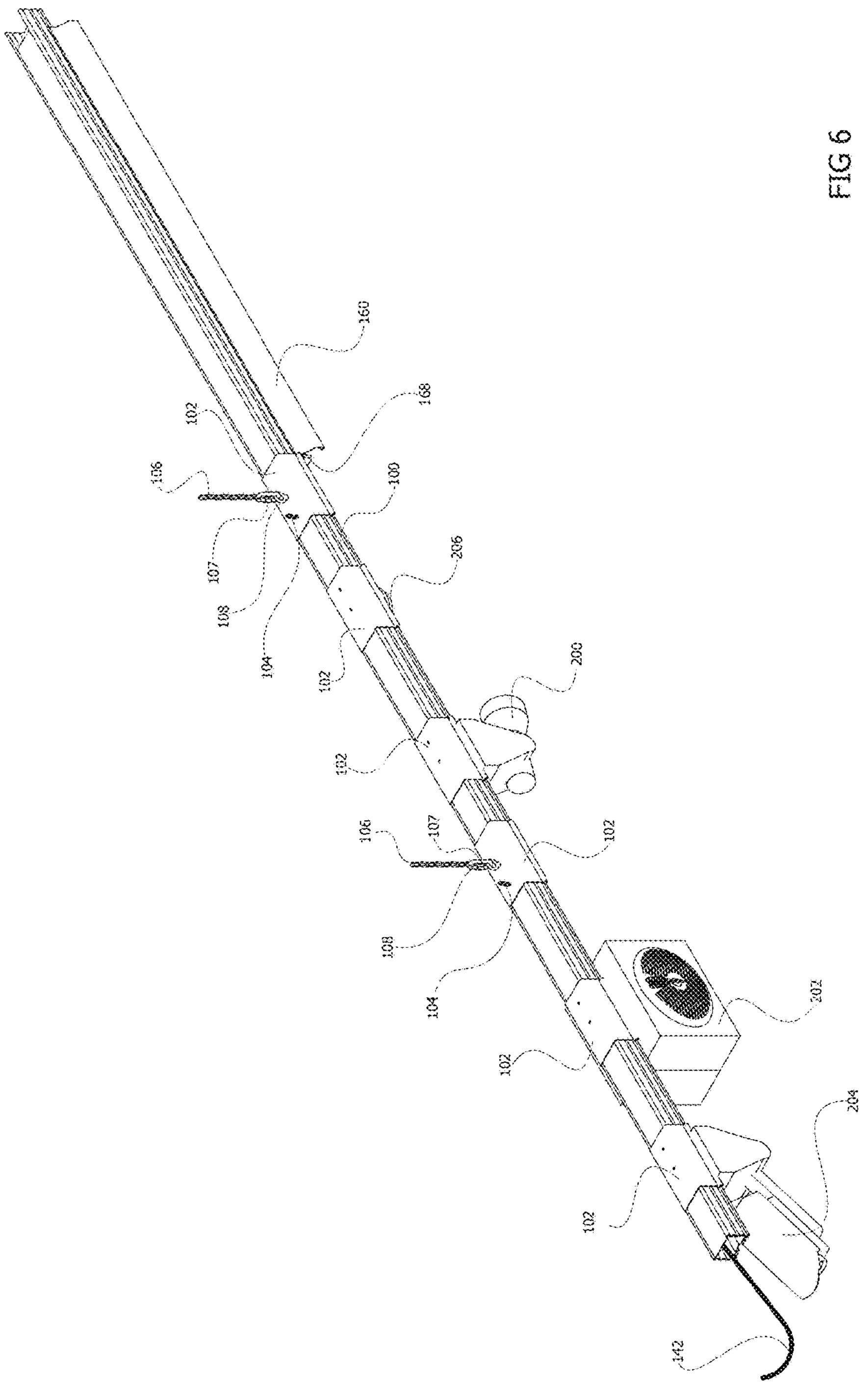
FIG. 6 is an isometric view of an exemplary system in a component-carrying mode of operation.

Referring now to FIG. 6, there is shown a further embodiment wherein the rail beam 100 herein is used as a platform for mounting various other electrical, electronic, and/or electromechanical devices. The embodiment of FIG. 6 takes advantage of the convenient (e.g., overhead) location in which lighting systems are typically installed, the availability of electric power in the beam 100 and the universal design of the rail for mounting one or more of any of a variety of components, including without limitation, a light, such as a lighting fixture 200, such as a spotlight, flood light, stage lighting, lighting effects, etc., which may be LED, incandescent, halogen, fluorescent, and so forth; an audio system 202 such as loudspeakers, audio amplifier, etc.; security camera 204; smoke detector or other sensors 206, and so forth.

Figure 7:
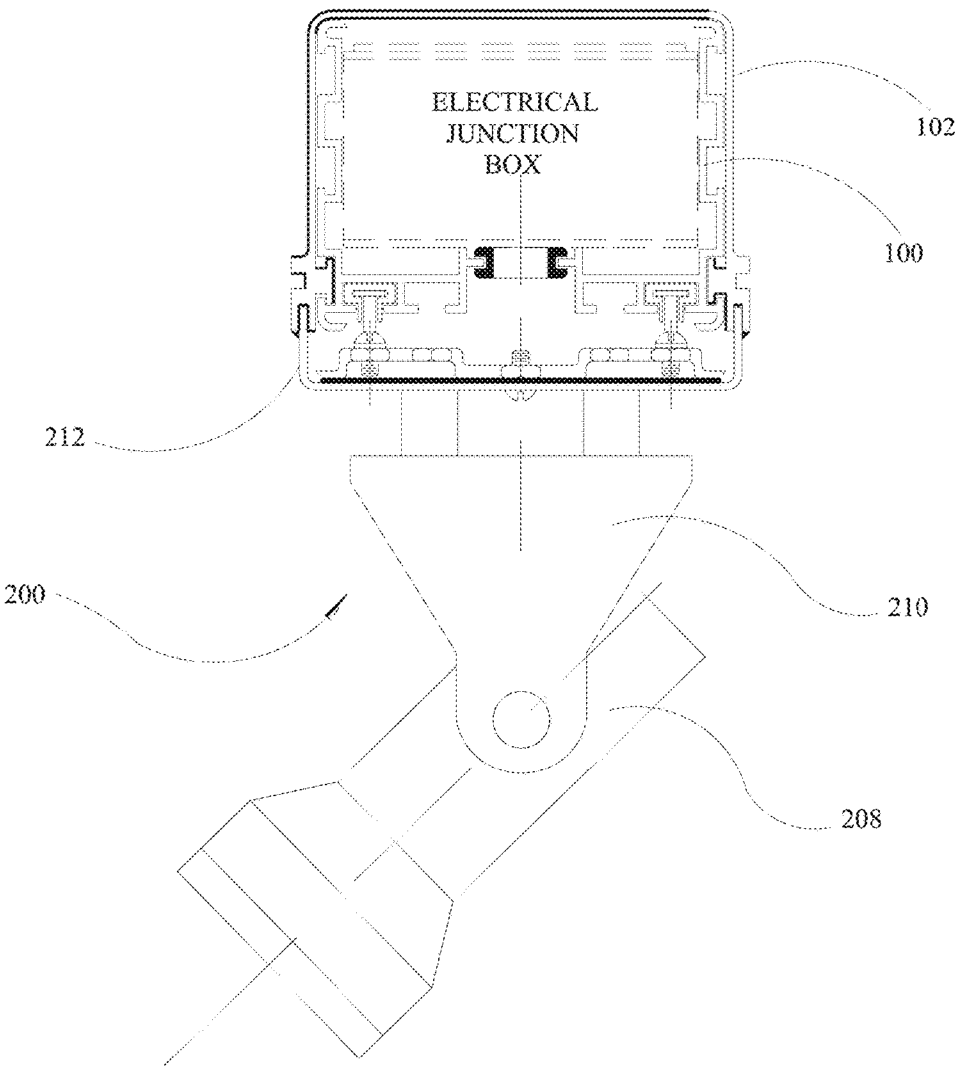

FIG. 7 demonstrates an exemplary method for mounting components to the rail 100 employing a section of a connector sleeve extrusion 102 as the interface to the system. The spot/flood light 200 includes a housing 208 which is pivotally attached to a swivel member 210, which in turn is rotatably attached to a mounting plate 212. The plate 212 includes upstanding edges which are received in complimentary facing grooves 214 (see FIG. 2) in the connector piece 102. The lighting fixture 200 is one example of the various designs that readily interface components into the lighting system. Such components may be introduced anywhere in the system as an alternative to the LED tube fixtures 160 or may be employed in addition to the LED/tube fixtures 160.

Figure 8A:
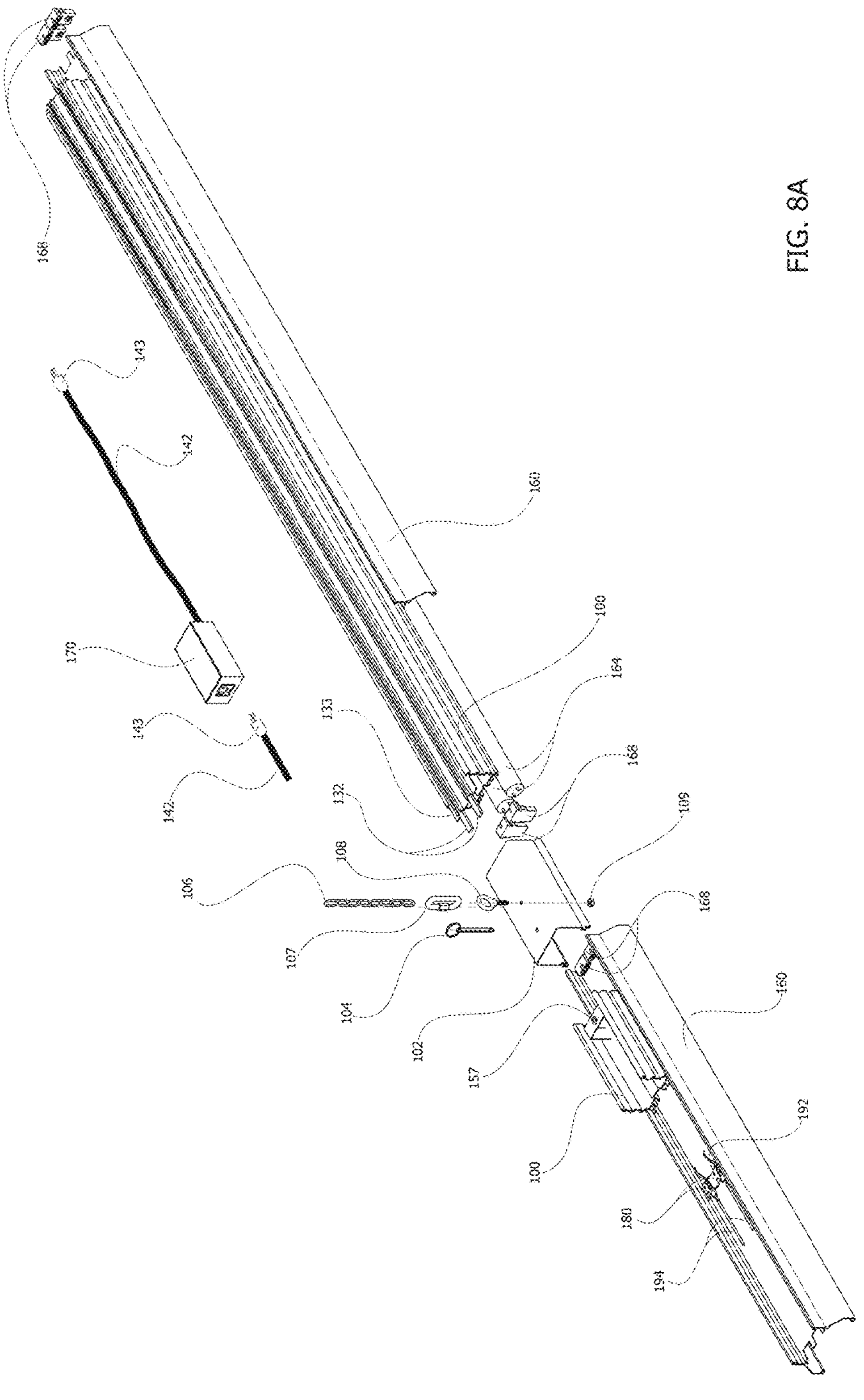
FIG. 8A is a partially exploded isometric view of an exemplary bi-directional system herein.
Figure 8B:
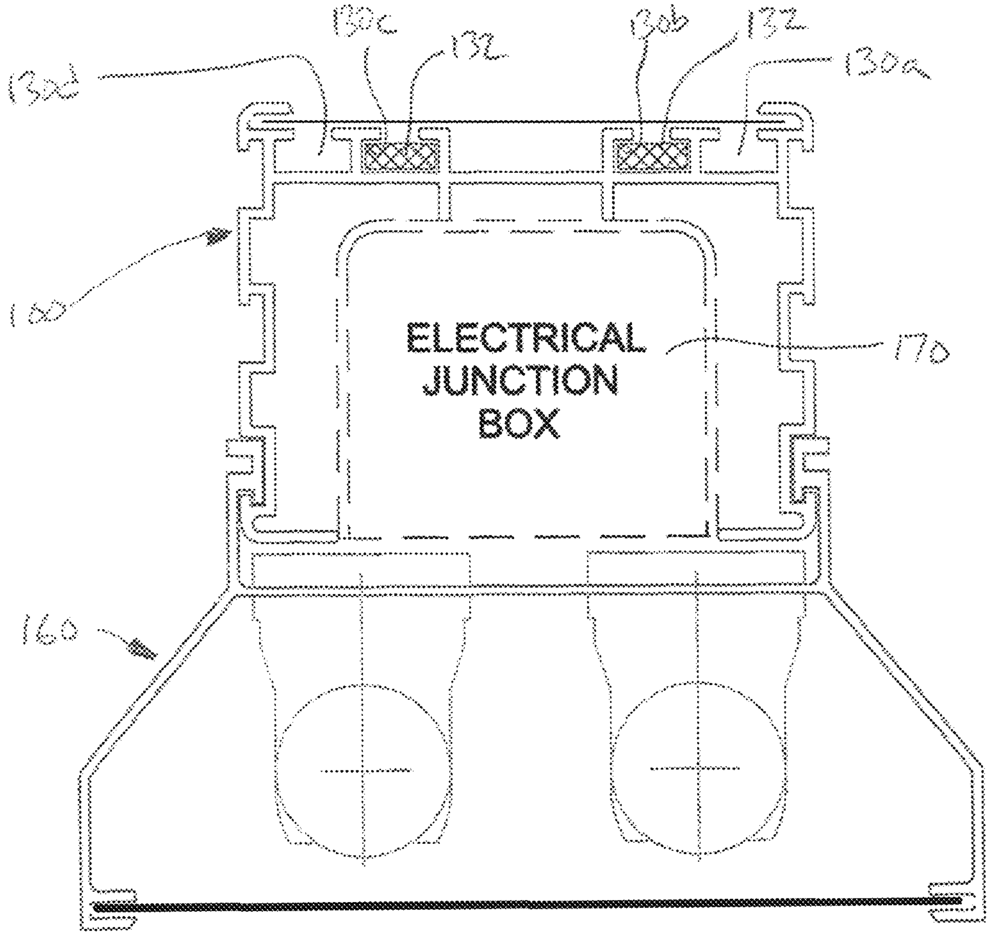
FIG. 8B is a cross-sectional view of an alternative bi-directional embodiment employing an inverted rail member.
Figure 8C:
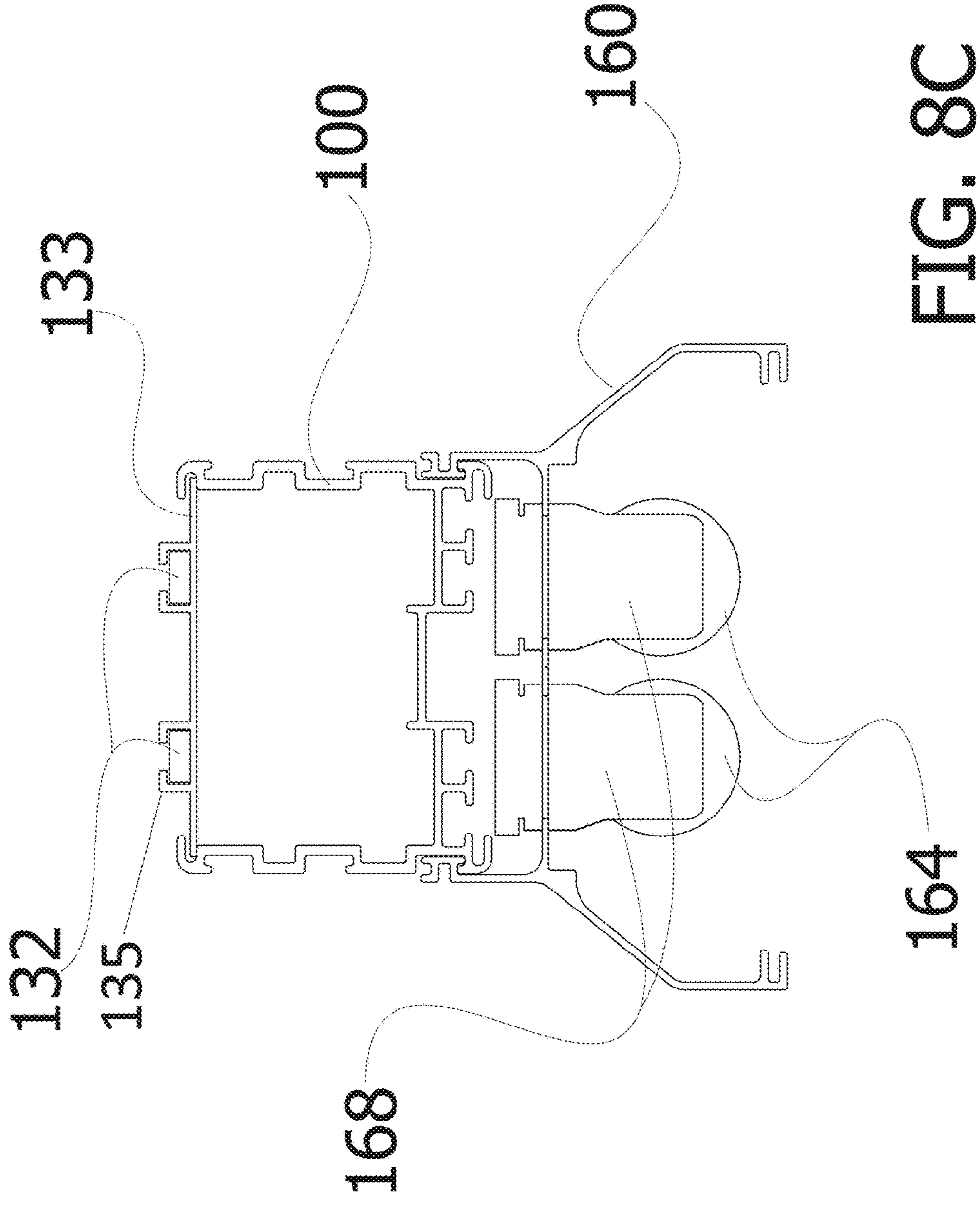
FIG. 8C is a cross-sectional view of the system appearing in FIG. 8A.

Referring now to FIGS. 8A and 8C, there is shown a bidirectional mode of operation of the lighting system herein, illustrating the versatility of the present development. The bidirectional mode of operation utilizes a rail members 100 adjoined as described above and having reflector assemblies 160 with tubular lamps 164 providing down lighting as detailed above with like reference numerals appearing in FIGS. 8A and 8C being as described elsewhere herein. Up lighting is provided by LED strips 132 which are slidably received in axially-extending channels 135 formed in an elongate panel 133. The panel 133 has two channels 135 for receiving the LED strips 132 in the illustrated embodiment, although other numbers of channels/strips are contemplated.

In a second bidirectional mode, appearing in FIG. 8B, the rail beam 100 is inverted relative to the orientation of the rail 100 in FIGS. 8A and 8C. One or more (two in the illustrated embodiment of FIG. 8B) LED strips are received in the channels 130*a*-130*d*, which face upward thus permitting upward lighting.

Lighting in a downward direction may be implemented using the track 122 for mounting the LED tubes assembly 160. One or more sections of the connector sleeve extrusion 102 may also be used to secure multiple beams 100 in end-to-end fashion as detailed above. Likewise, sections of the connector sleeve 102 may also be used to employ components as described in FIGS. 6 and 7 as an alternative to the LED assembly 160 or in combination therewith. A separate electrical junction box 170 and 12-volt power supply 140 (not shown) may be provided in the channel 116. In preferred embodiments of the bi-directional modes, upward and downward lighting may be controlled independently.

Figure 10:
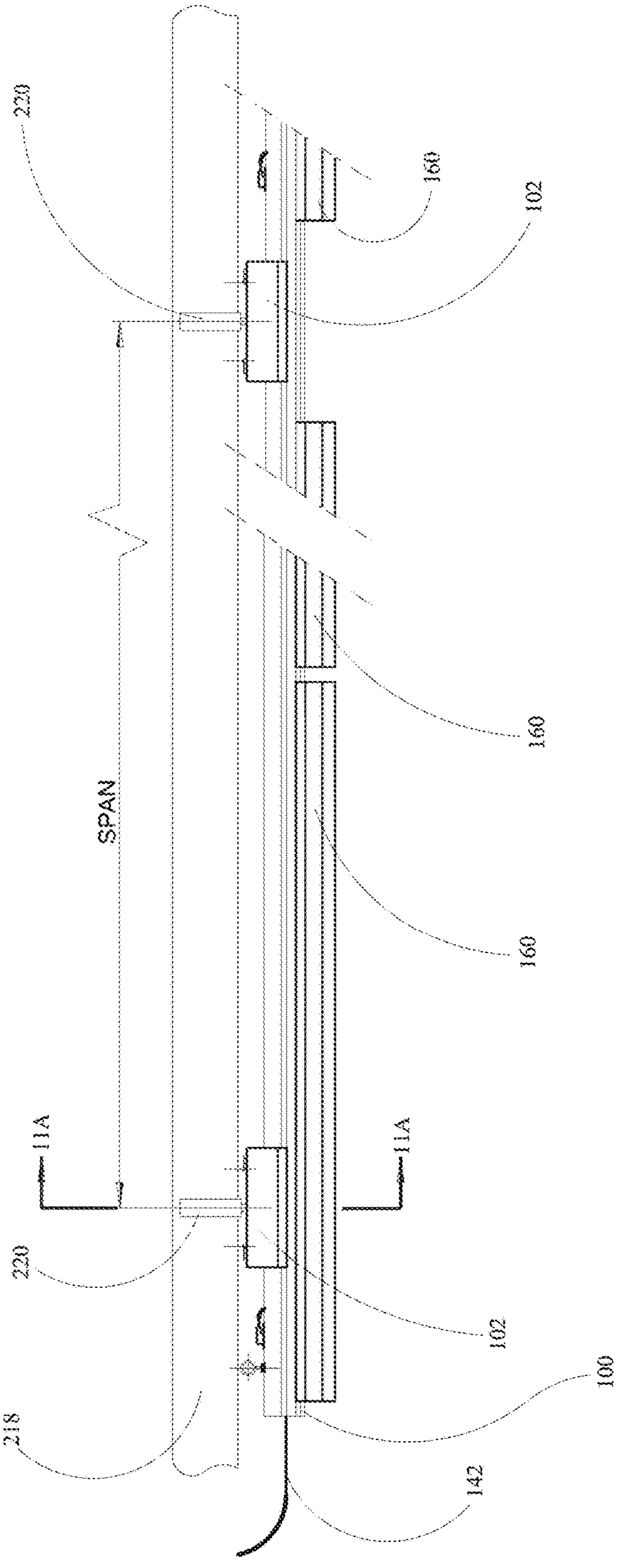
FIG. 10 is a side view illustrating an alternative method for attaching the system herein to an overhead structure.
Figure 11A:
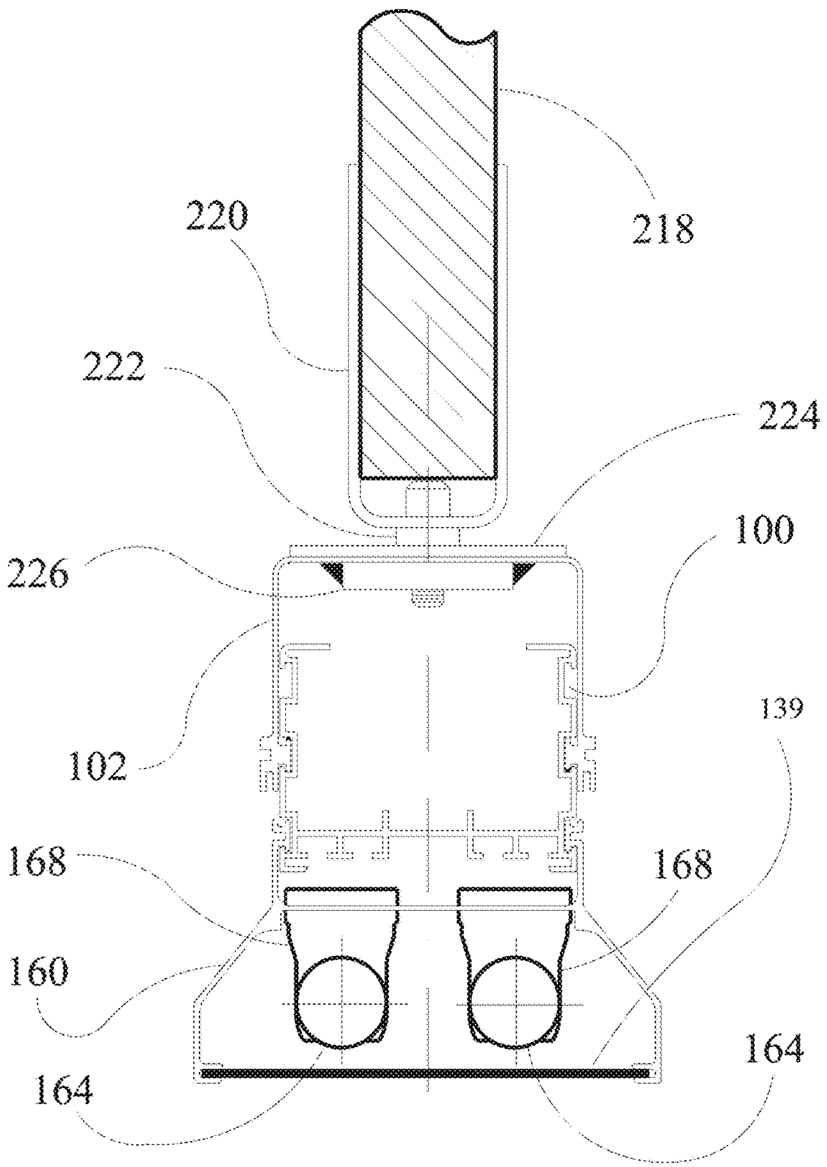
FIG. 11A is a cross-sectional view taken along the lines 11A-11A in FIG. 10.
Figure 11B:
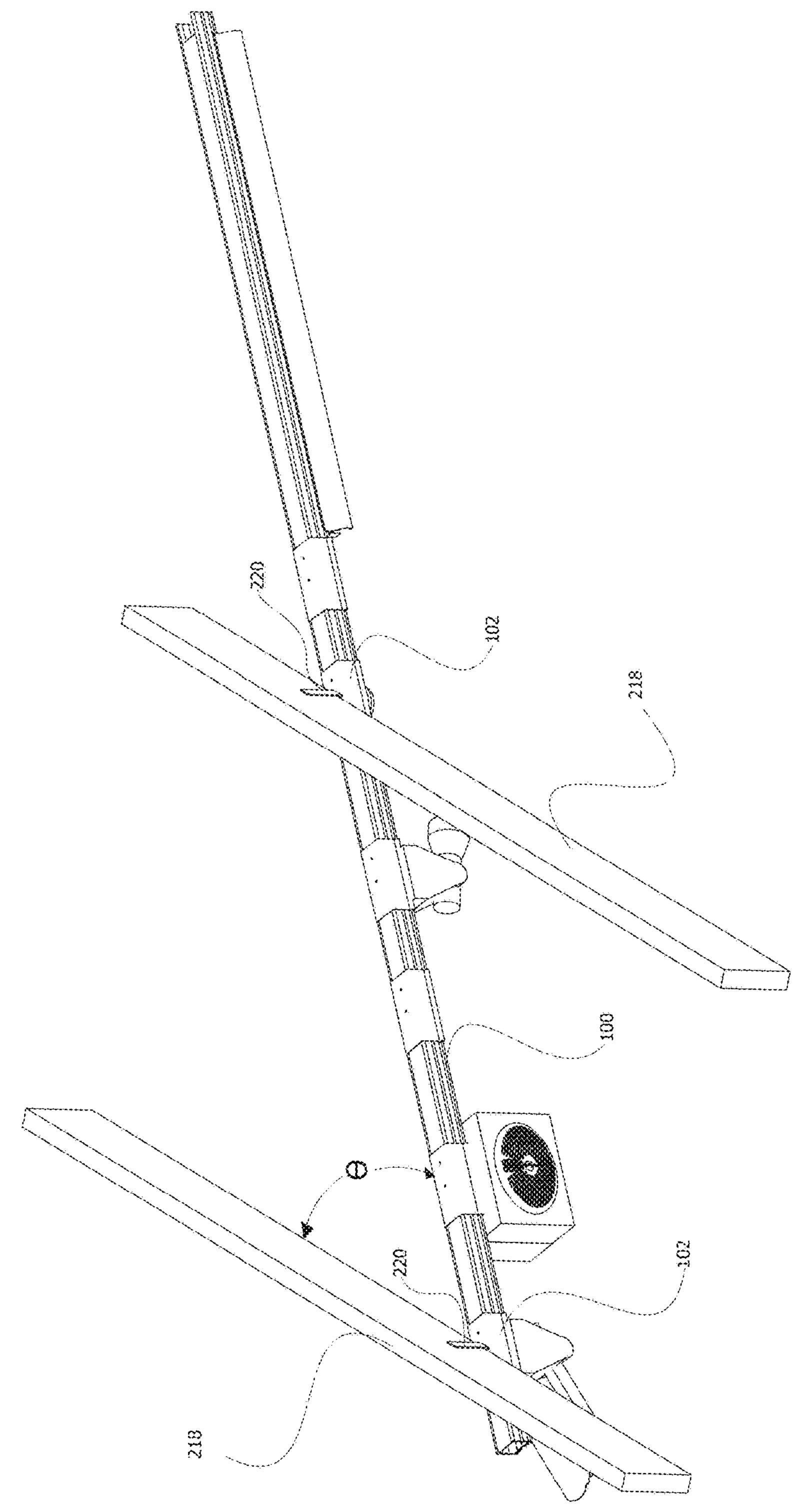
FIG. 11B is an isometric view illustrating the use of a swivel fastener to attach a lighting system herein at a desired angle θ relative to overhead joist or beam elements.

FIGS. 10 and 11A illustrate an alternative to chain or cable mounting where building support beams, rafters, roof joists, etc. 218 are available. This installation method employs a section of connector sleeve 102 which has been modified to function as a base for a swivel mount which includes a yoke or fork 220 which is rotatably fastened to the sleeve section 102 via a pivoting fastener 222. Washers, bearing plates, or the like 224 and 226 may be provided to strengthen or prevent deformation of the connector sleeve section 102 under load. The yoke 220 may be secured to the beam 218 with screw or bolts (not shown). The swivel feature allows the lighting system to be mounted parallel, perpendicular, or, as shown in FIG. 11B, at any desired angle θ relative to the beams 218. The span is infinitely adjustable since the connector sleeve 102 may slide to any position using the center tracks 120 of the rail 100, although other tracks or channels on the beam 100 could be used. For example, in light bar mode with the reflector assembly 160 omitted, the connector sleeve 102 with the beam mounting for 220 could be attached to the beam 100 using the lower tracks 118. Installation may be accomplished as shown in FIG. 10 with the connector sleeve at the connection between multiple assemblies or using two or more connector sleeves on a single assembly.

Figure 12A:
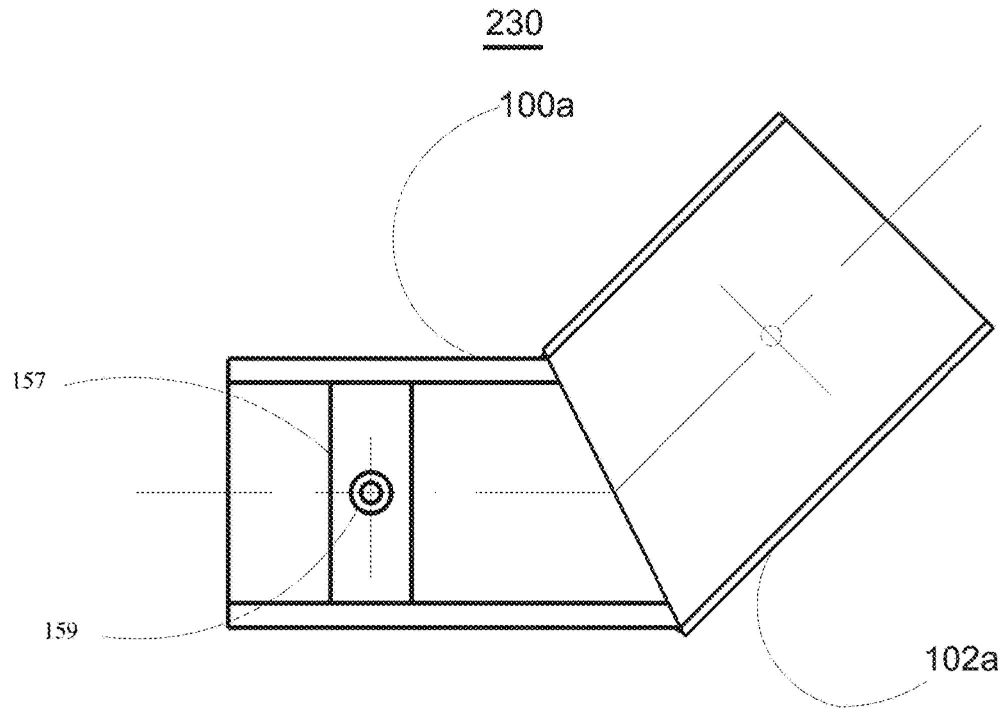
FIGS. 12A and 12B illustrate two exemplary nonlinear connector fittings.

Connecting assemblies using the connector sleeves 102 described in this disclosure is not limited to straight line connections. In applications requiring large areas to be illuminated, changes in direction of the lighting array may be desired. The present system may achieve this by using fittings fabricate from the same extrusions obtained from the linear sections described above. For example, FIG. 12A illustrates an exemplary angled connector 230 comprising a section of main rail extrusion 100*a* and a section of connector sleeve extrusion 102*a*, each being saw cut at the required angles and spot welded together to the angled fitting 230. A support plate 157 and flanged bearing 159 may also be provided for using a quick connect fastener, such as the pin 104 as described above.

The illustrated fitting 230 is a 45° ⅛ turn fitting, although it will be recognized that the connector 230 could be any desired angle. This fitting may then be inserted into a straight section in the same manner used to connect straight sections (e.g., using a quick release pin or like fastener). A second fitting 230 could be inserted in a similar manner into the first fitting 230 to complete a 90° turn. For a 90-degree turn employing two 45° fittings 230, a straight section may optionally be inserted between the two 45° fittings. FIG. 12A shows a left hand turn, whereas a right hand turn fitting may be constructed by simply reversing the direction of the interior saw cuts.

Figure 12B:
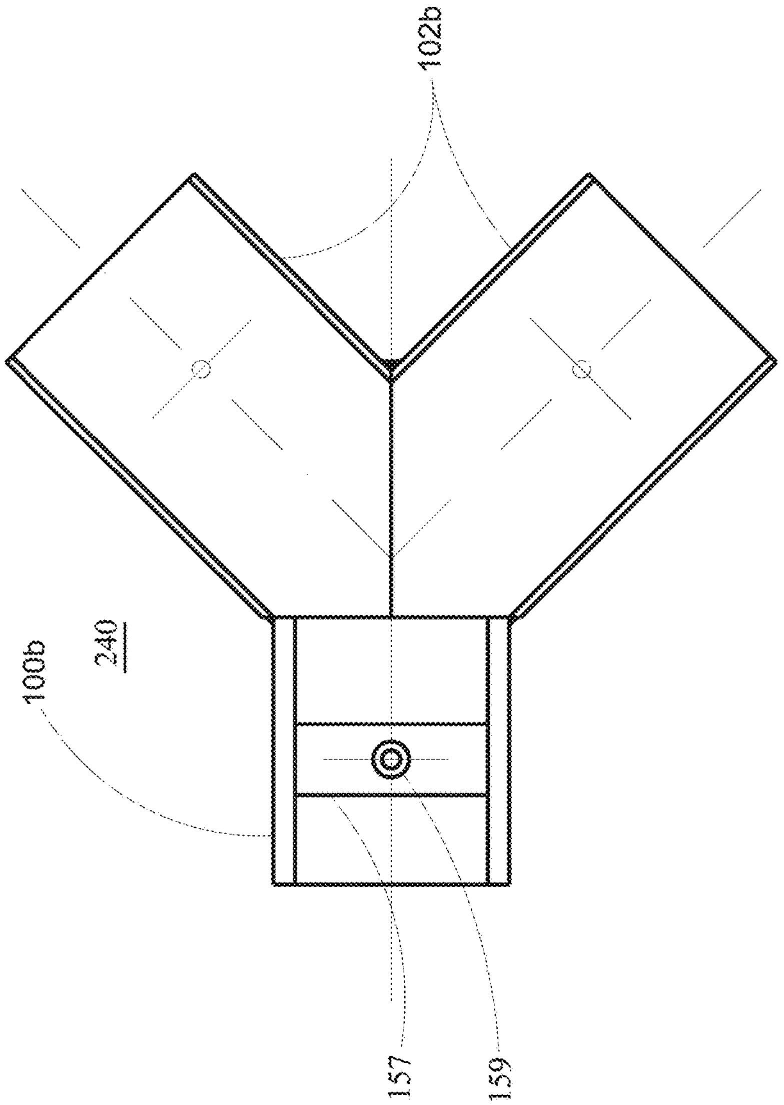

FIG. 12B illustrates a "Y" connector 240 that is constructed using a short section 100*b* of the main rail extrusion and two short sections 102*b* of the connector sleeve extrusion. To construct the connector 240, a 90° fitting may be fabricated by spot welding the two short sections of connector sleeve extrusions 102*b*, each cut at 45° at one end. This 90° subassembly may then be cut to fit the end of the short section 100*b* of the main rail extrusion and welded to the sections 102*b* to complete the Y-connector 240. Electrical power may be provided at the branched connection by providing a second outlet and junction box to the linear assembly that it connects to in order to feed both branches of the Y-connector 230. A support plate 157 and flanged bearing 159 may also be provided for using a quick connect fastener, such as the pin 104 as described above. Alternatively, two short lengths of power cord with female connectors on each cord may be connected at the junction box.

In still further embodiments, the lighting system in accordance with the present disclosure may be adapted for use in connection with a suspended ceiling system of the type installed on a grid system suspended from a higher ceiling with cables, chains, wires, etc. Typical commercially available hardware is based upon a 2'×4' grid, with most of the grid filled with 2'×4' solid tiles or lighting fixtures. The prevalent design for the conventional fluorescent grid fixture utilizes a 2'×4' chassis with two or more (typically four) fluorescent tubes integrated into the chassis structure.

Figure 13A:
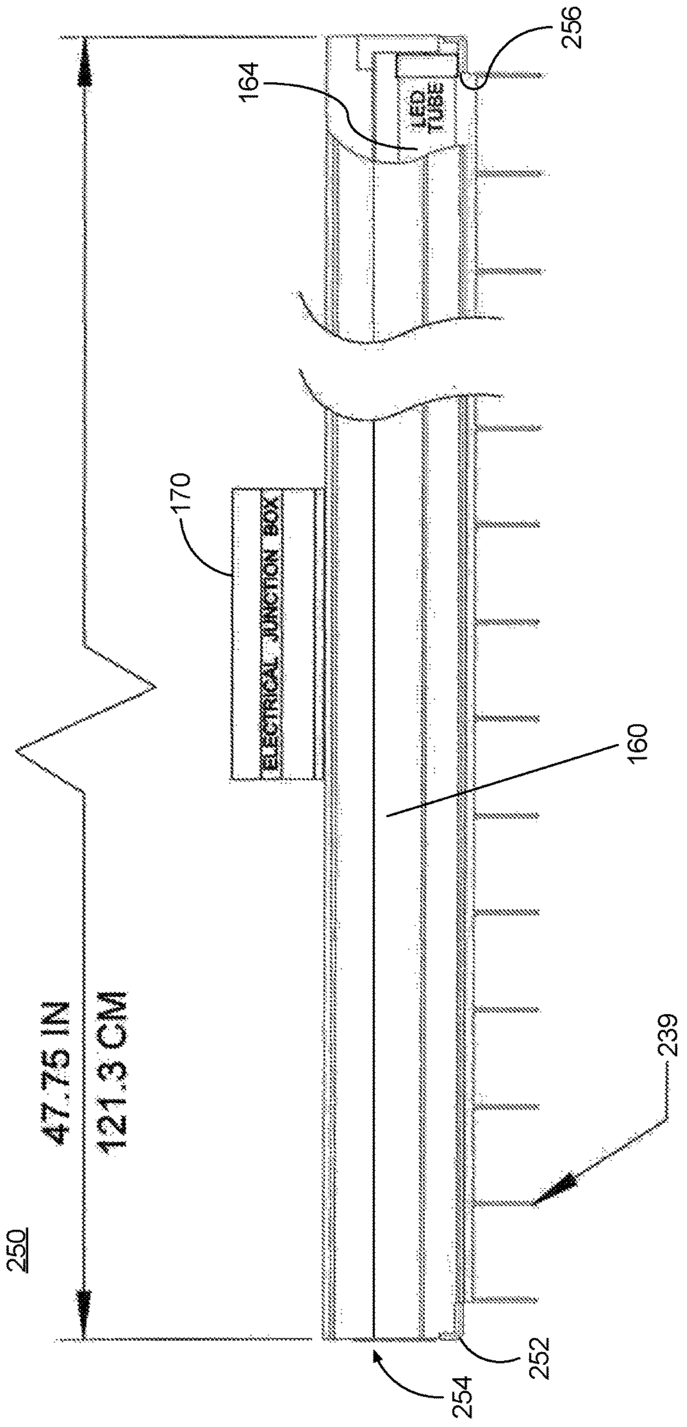
FIGS. 13A-13C and FIG. 14 illustrate an exemplary embodiment adapted for use in connection with a suspended or drop ceiling system.
Figure 13B:
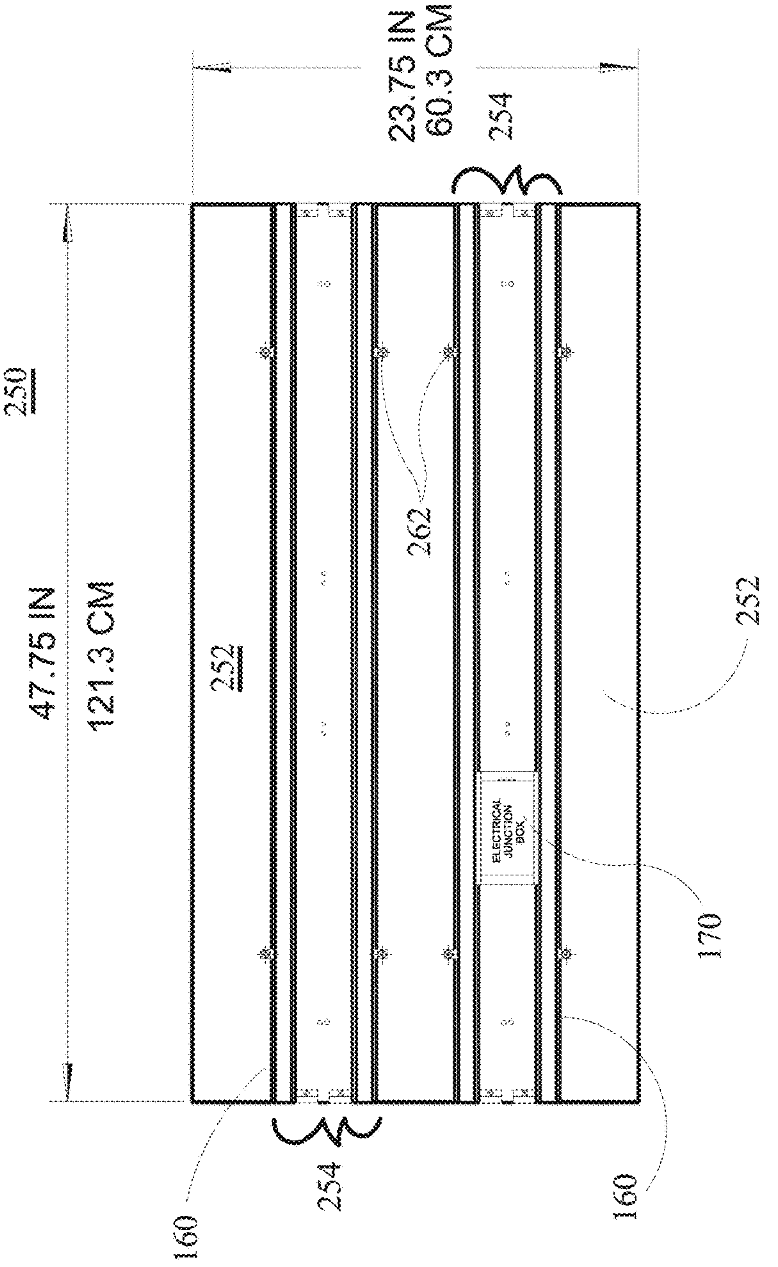
Figure 13C:
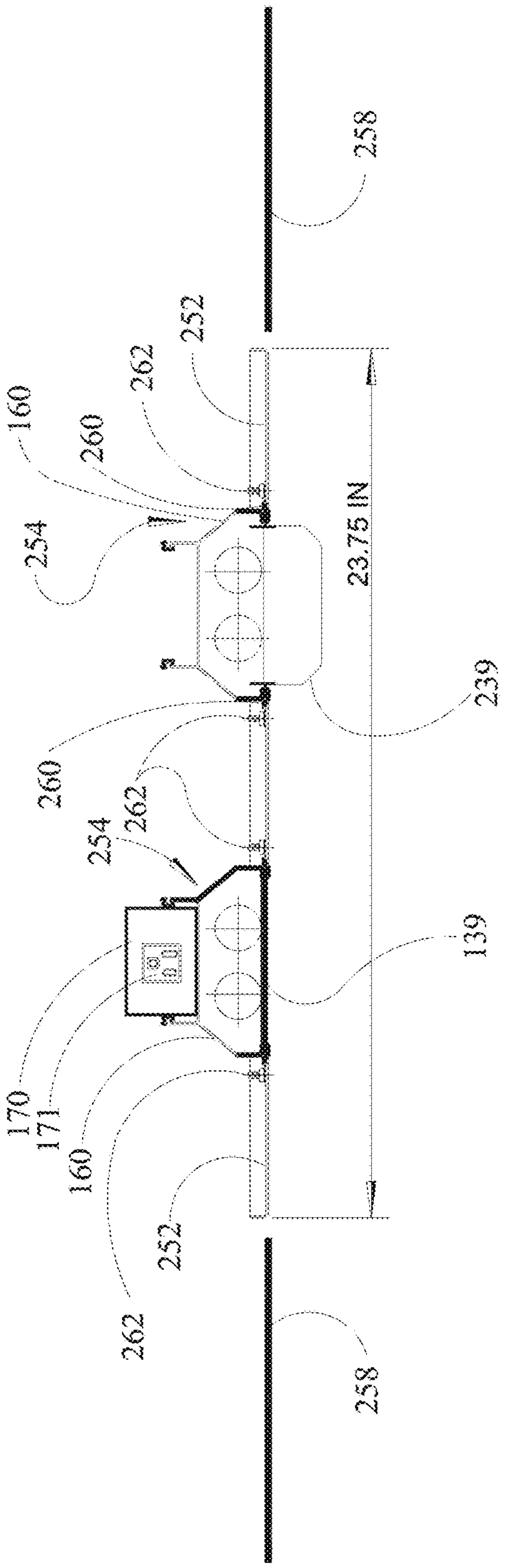

Referring now to FIGS. 13A-13C, there is shown a further embodiment lighting fixture 250, which includes a mounting tray 252 having one or more (two in the illustrated exemplary embodiment) separate light assemblies 254 fastened to the tray. The mounting tray 252 is designed to accommodate the light modules 254 by providing rectangular openings 256 slightly larger than the downward face of the module 254. FIG. 13C illustrates two optional light diffusers, the first being a flat panel diffuser 139 and the second being an egg crate diffuser 239. In contrast to conventional egg crate type diffusers, which are located within the fixture structure above the ceiling level 258 and rely on collimating the light from the tubes 164 downward. The present egg crate diffuser 239 collimates the light but also reflects and partially transmits light on the panels depending on the material used. This results in the egg crate panels appearing to be illuminated but also shielding the bright LED tube.

Each light assembly 254 in the fixture 250 includes a reflector hood structure 160 received on the tray 252. The reflector structure 160 includes is designed with flanges 260 on both sides to properly position the module 254 to the desired height relative to the tray 252 and fasteners 262, e.g., threaded fasteners, clips, etc., are used to fasten the modules 254 to the tray 252. Although a two-module assembly is illustrated, it will be recognized that one to as many as four modules 254 may be incorporated into the mounting tray 252 with a minimum amount of modifications to the tray. Module design does not require additional modification. The junction box 170 is received between the upstanding sidewalls of the reflector hood 160. The electrical connection may be as described above for the previous modes described above. For example, the modules may be interconnected at the junction box 170, wherein the junction box is equipped with a power cord for connecting the assembly into an external power outlet of the building or structure or into an AC outlet 171 provided in the junction box of another, like fixture 254, e.g., adjacent to or ahead of it.

Figure 14:
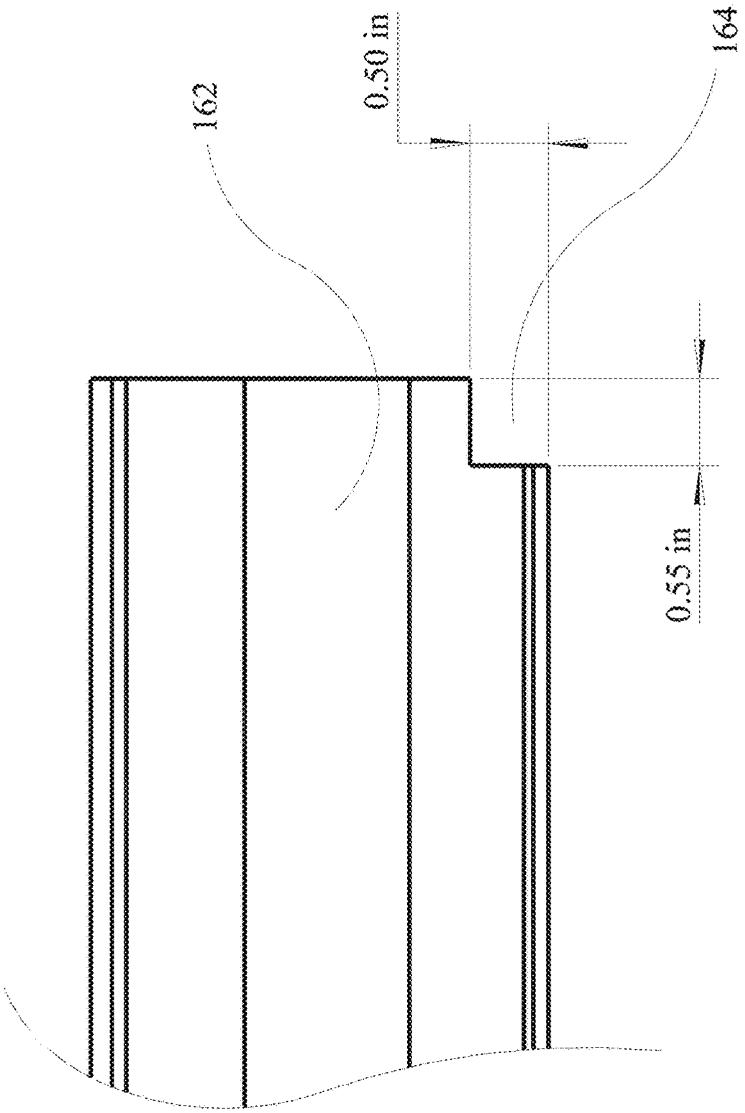

Except for the mounting tray 252, all other hardware used for the module 250 is the same as used for the modes previously outlined in this disclosure, except that the extruded reflector hood 162 of the LED reflector assembly 160 must be modified with notches 264 (see FIG. 14) in the lower corners in order to provide sufficient clearances for nominal 48-inch LED tubes 164 when the assembly 254 is mounted onto the tray 252.

One advantage of this modular fixture 250 over the conventional single integrated fixture is that the end user may modify the light distribution simply by changing the number of light modules 254 included on the mounting tray 252. Manufacturing is simplified whereas only one module design is produced regardless of the number of modules 254 configured onto a tray.

Figure 13D:
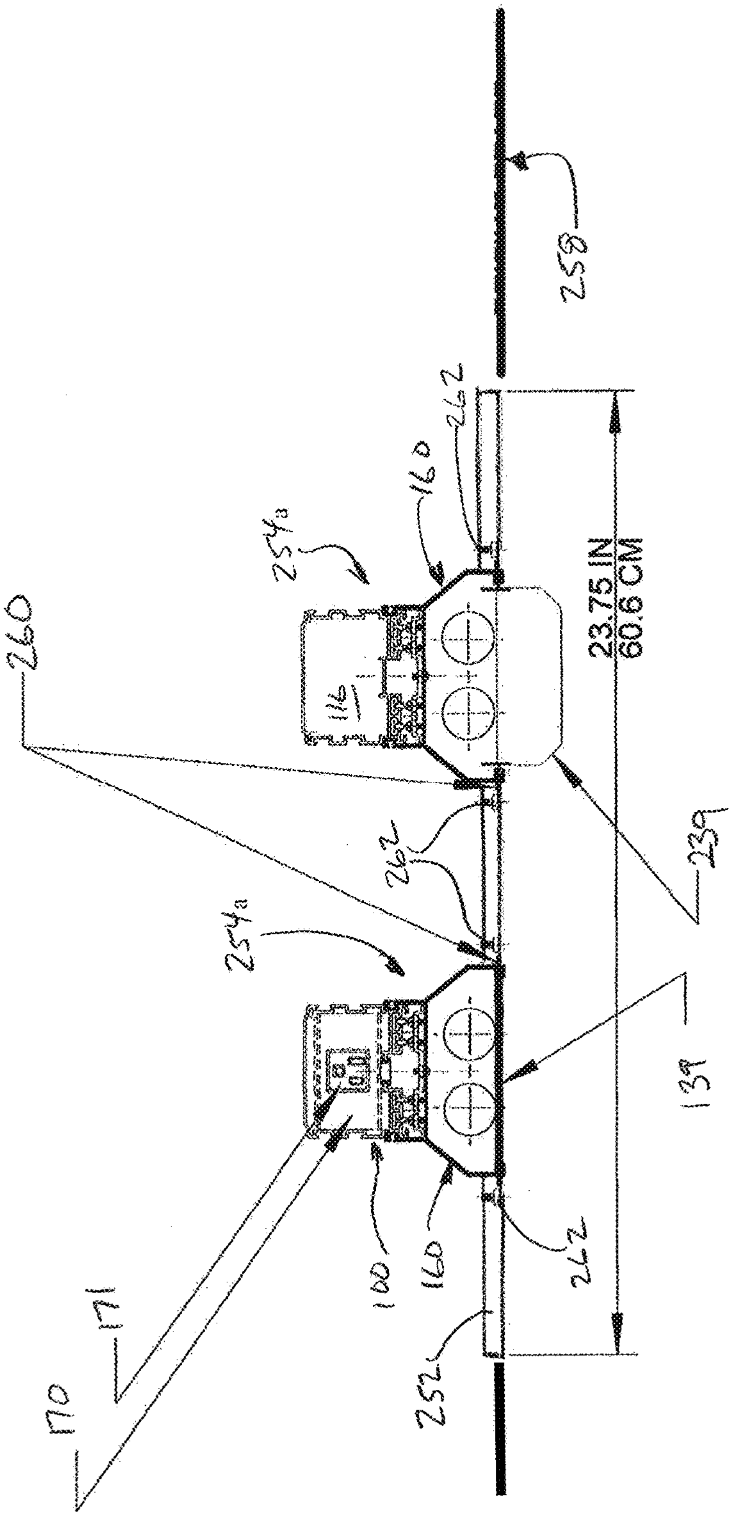
FIG. 13D illustrates an alternative embodiment adapted for use in connection with a suspended or drop ceiling system.

FIG. 13D shows a variation of the above ceiling grid embodiment, which is otherwise as described for FIGS. 13A-13C, except that lighting modules 254*a* employ the reflector assembly 160 mounted to a section of rail 100 as detailed above, wherein the channel 116 thereof may be used to receive the junction box 170 and wiring as detailed above.

Figure 15A:
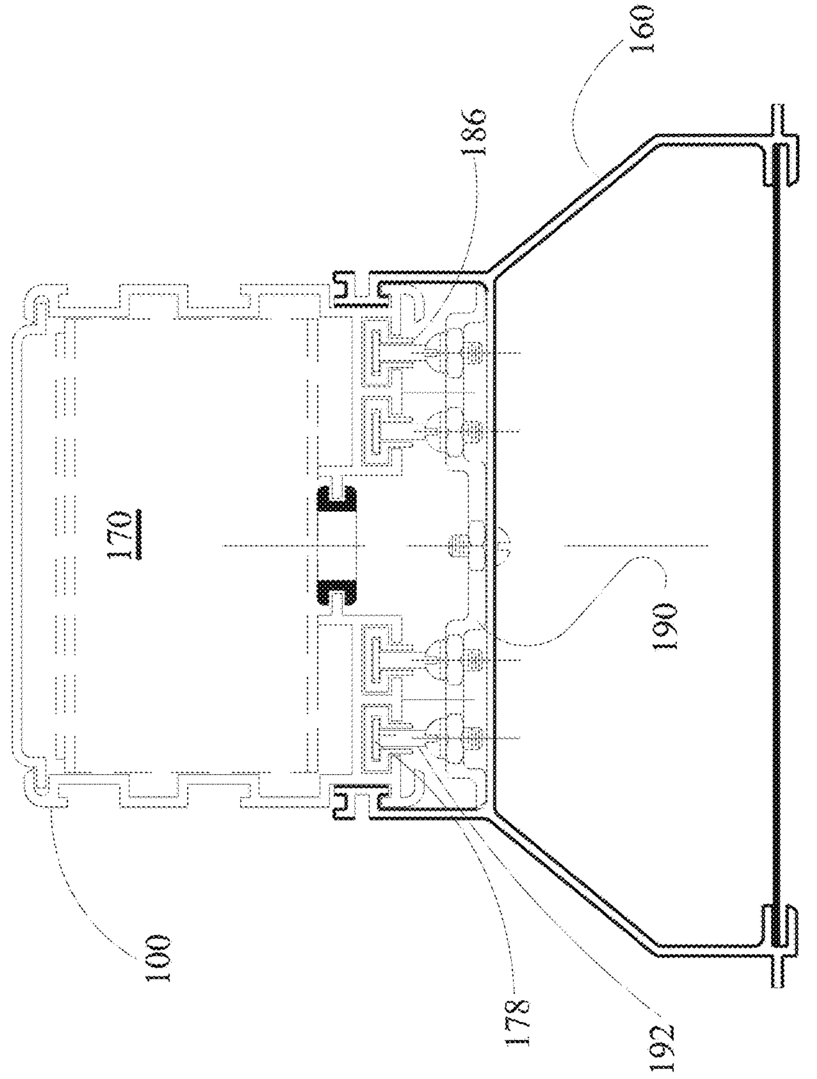
FIG. 15A is a cross-sectional view illustrating an exemplary method for electrically coupling power delivery rails to an electrical power supply.
Figure 16C:
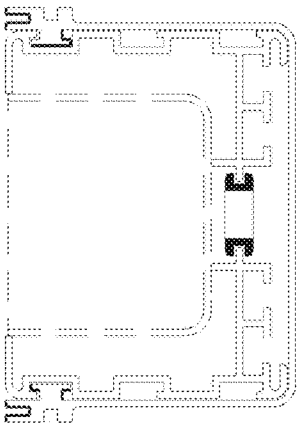
FIGS. 16A-16D are cross-sectional views of the main rail and connector sleeve in various configurations.
Figure 16D:
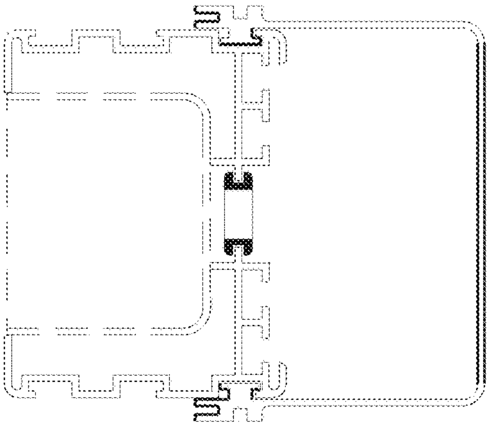
Figure 16A:
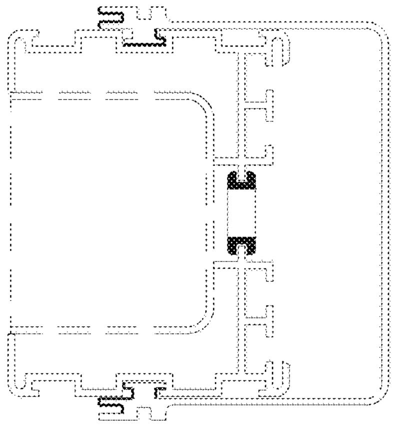
Figure 16B:
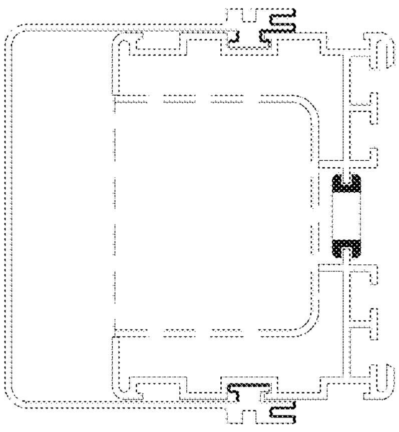

Referring now to FIGS. 15A-15D, there is now shown an exemplary method for delivering power using the slots 130*a*-130*d* formed in the lower surface of the main rail 100. The slots 130*a*-130*d* are available for transporting power to the LED tube fixtures or other devices mounted on the rail/track. A linear brush and flat conductor mechanism (linear version of slip rings) using the slots 130*a*-130*d* for this purpose is illustrated in FIGS. 15A-15B, which present an overview of the power transport mechanism where the slots 130*a*-130*d* used as guides or channels for flat wire conductors 178. Extruded insulator channels 186 having downward facing, axially-extending slots or openings are provided to isolate the flat wire 178 from the grounded aluminum rail structure 100.

As detailed above, the ends of the flat wire 178 are connected to insulated round wires 176 from the junction box 170 using terminal connectors 180 (see FIG. 5B). The round wires 176 are then fed into the junction box 170 where it is connected to the power input lead.

The block/brush assembly 190 shown in FIGS. 15B-15D is attached to the light fixture 160 that is mounted to the rail 100. The brushes 192 are then connected to insulated wire leads 194 (see FIG. 5C) from the mounted devices with terminals. Sliding the LED fixture 160 onto the rail 100 results in brush 192 contacting the flat wire 178 through the axially-extending slots, thus completing the power feed to the LED assembly 160. A similar brush/block assembly may be employed to provide power to other mounted components such as those described in FIG. 6. One advantage to using this linear brush connector system in accordance with this preferred embodiment is that the light fixtures can be installed and removed at the site installation with no additional wiring being required. This is a considerable advantage in that it permits the fixtures to be assembled, factory wired, and shipped completely independently from the rail 100. Flexibility is also gained in that fixtures may be added or subtracted from the rail by simply sliding them on or off the rail for any lighting configuration modification.

FIGS. 17-26, 27*a*-27*f*, and 28 illustrate track system embodiments herein that are configured to further improve manufacturing processes, reduce installation costs, and provide an enhanced user interface. The prominent feature of the presently disclosed lighting system is to provide the user with a high degree of flexibility to configure a track system with mating luminaire modules capable of accommodating various lighting components. Three luminaire modular concepts are described herein, namely, tube lamp, strip light, and component modes.

In preferred embodiments, the length of the primary module is 4 feet, which is compatible with commercially available light tubes, although other lengths are contemplated. An improved method of mechanically interconnecting modules to attain a continuous track system which facilitates handling and installation is described below.

As best seen in FIGS. 27*a*-27*f*, adjacent luminaire modules can be electrically interconnected simply by plugging harness assemblies together. This eliminates the need for licensed electricians except for hard wiring of the first module of the track. Alternatively, a plug in version wherein the first module is plugged into an electrical outlet of the building or structure where the luminaire is to be installed is also available. For example, a plug in module may advantageously be employed for temporary installation of the first module.

The configuration options of the disclosed track system offer a significant set of potential applications. The ease of mechanical and electrical interconnections works very well for temporary lighting as required for construction, short-term events, emergencies, etc. The component mode in conjunction with the strip light mode is highly desirable for applications requiring a variety of lighting inputs such as retail stores, museums, lobbies, workshops, etc. A multi-mode system is useful for accenting merchandise in retail stores, artwork illumination in museums, concentrating light on close work areas using spotlights provided from the component mode luminaire module. This same module is designed to simultaneously provide lower level background lighting of floor space.

A method of moisture and dust sealing the electronics enclosure is also described in this disclosure. In certain embodiments, the design of the luminaire extrusion includes a configuration that permits a simple upgrade to accomplish the sealing at minimal cost. Agricultural installations in greenhouses are well suited for this design. In certain embodiments, the track fixture is composed of plastic and aluminum for high corrosion resistance. Moisture sealed LED strips may be used as the lighting media. Such LED strips are commercially available in red and blue as well as white for optimal plant growth. These strips operate at 24 volts DC which offers an option for direct connection to solar cells and batteries. This design may also be advantageously employed for use in connection with military lighting for temporary battlefield applications.

The present disclosure also describes a method of using the track modules for grid ceiling fixtures with no modifications of the basic luminaire extrusion. Rather than being assembled end to end for a track fixture installation, the luminaire modules are assembled side by side on a tray with outside dimensions (typically 2'×4' or 2'×2') that are compatible with common grid ceiling installations. The tray design may also function as an independent light fixture for high bay ceiling facilities.

Figure 17:
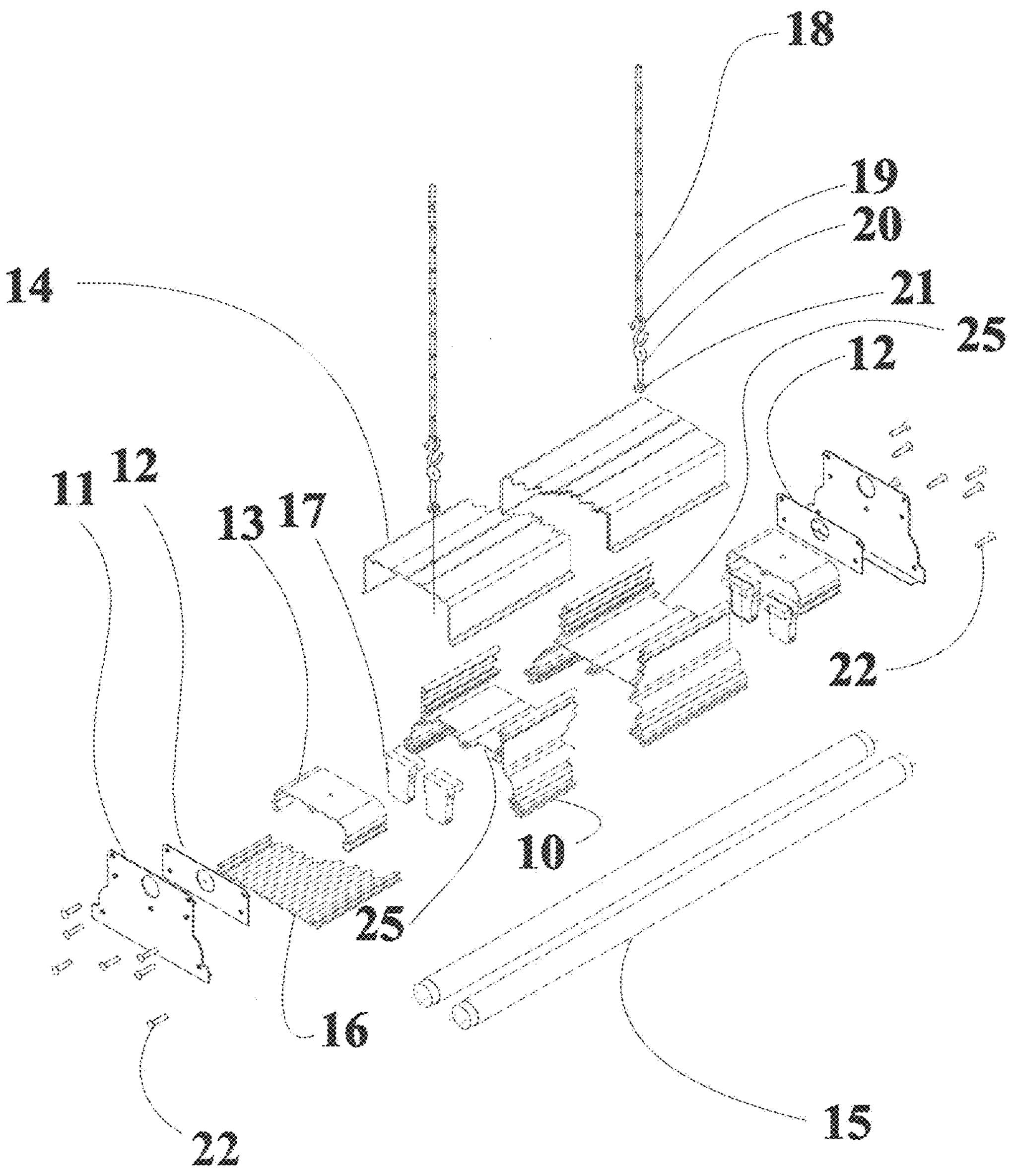
FIG. 17 is an exploded view of a further luminaire embodiment employing LED tubes.
Figure 18:
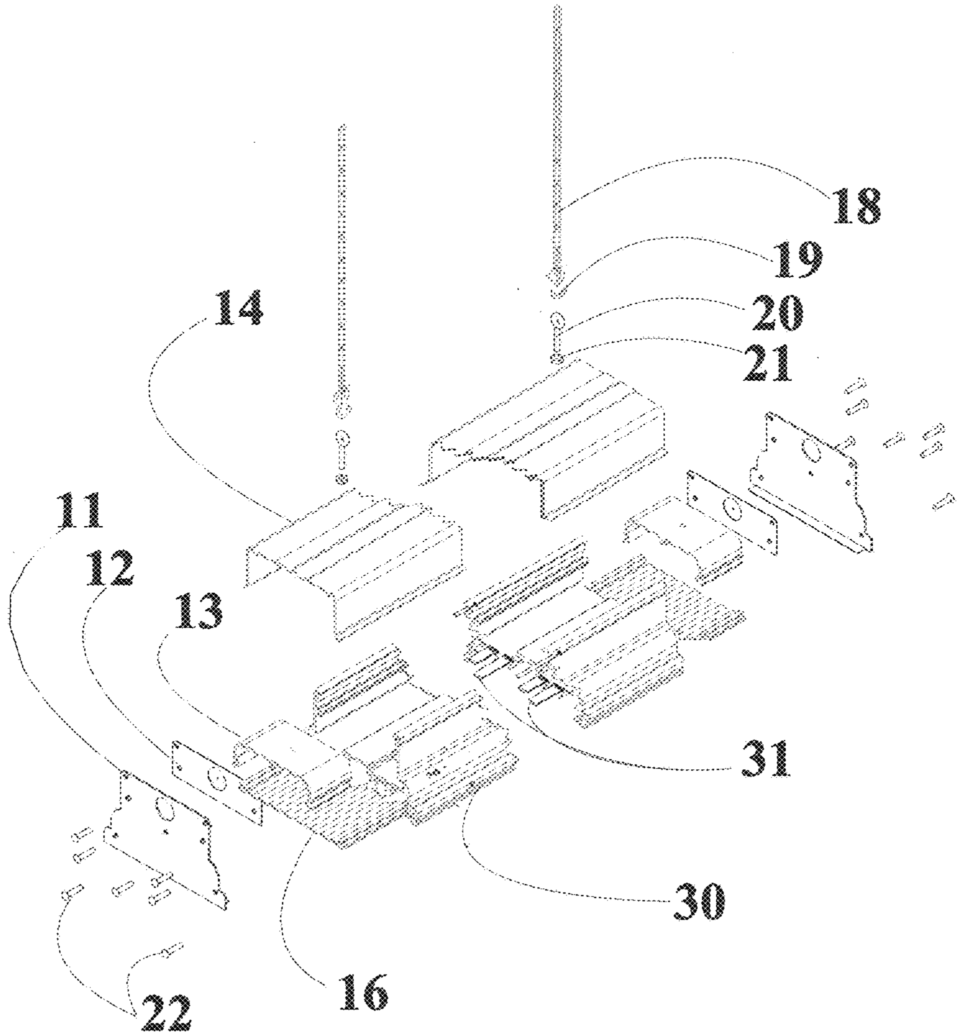
FIG. 18 is a further luminaire embodiment employing flexible LED strips.

FIGS. 17 and 18 show luminaires which comprise an exemplary multi-mode track lighting system. The core component of the luminaires is the reflector hood extrusion 10 (see LED tube embodiment appearing in FIG. 17) and 30 (see flexible LED strip embodiment appearing in FIG. 18), which may be fabricated from a metal or polymeric material, such as aluminum or flame resistant plastic. A cross-sectional view of the reflector hood extrusion 30 appears in FIG. 20. A cross-sectional view of the reflector hood extrusion 10 appears in FIG. 21. The two designs are share identical outside profiles while the inner designs vary according to configurations required to accommodate conventional tube (extrusion 10) light sources or flexible LED (extrusion 30) light sources.

FIG. 17 represents an exploded view of the tube configuration which can be fabricated, e.g., in 24" or 48" lengths accommodating tubes 15 having industry standard lengths. Cutouts 25 are provided on the transverse or horizontal cross web 26*a* to accommodate tube sockets 17. Sockets are then retained by end plates 11 and screws 22.

Figure 24:
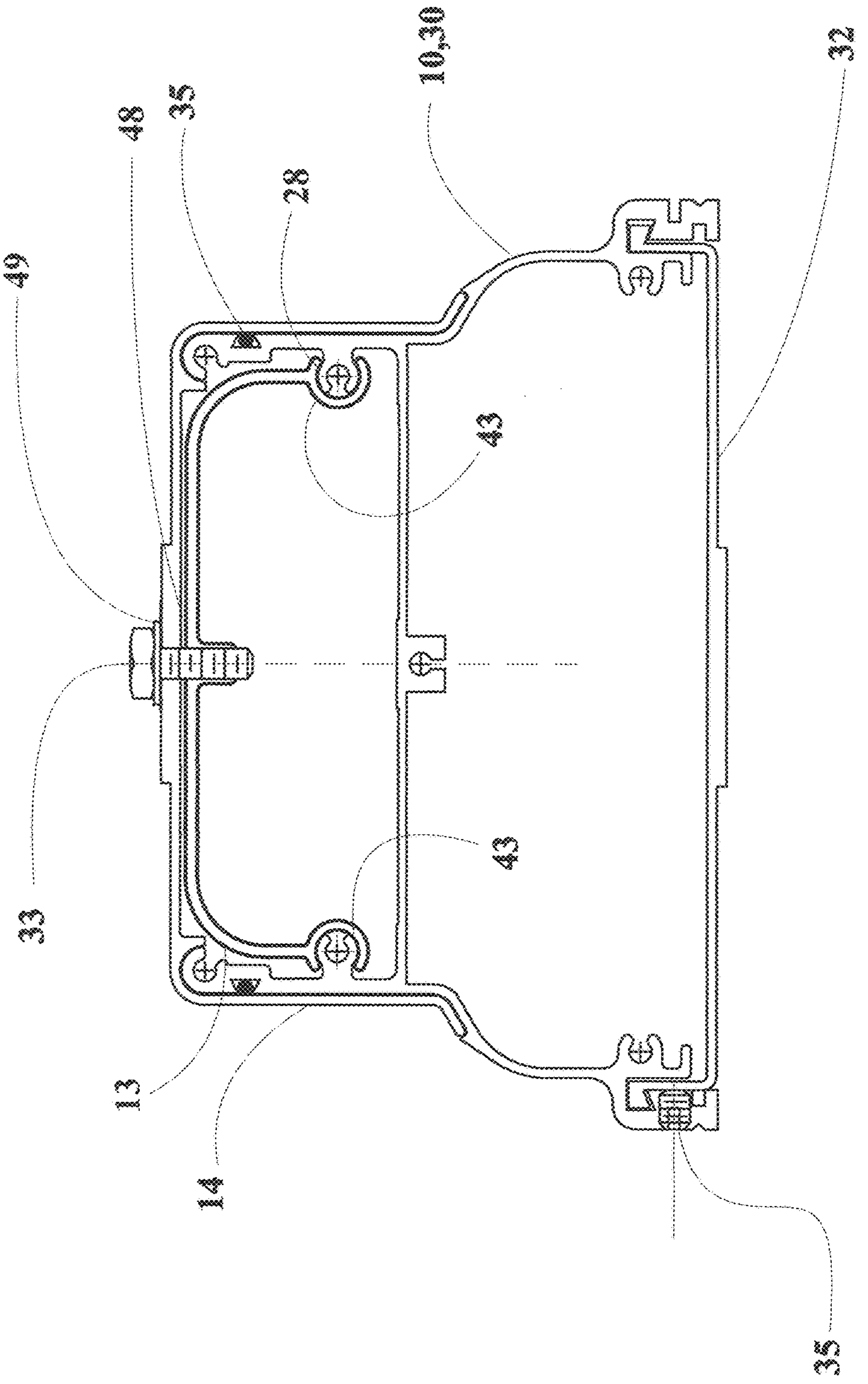
FIG. 24 is a cross-sectional view taken at the at the assembly bridge.
Figure 25:
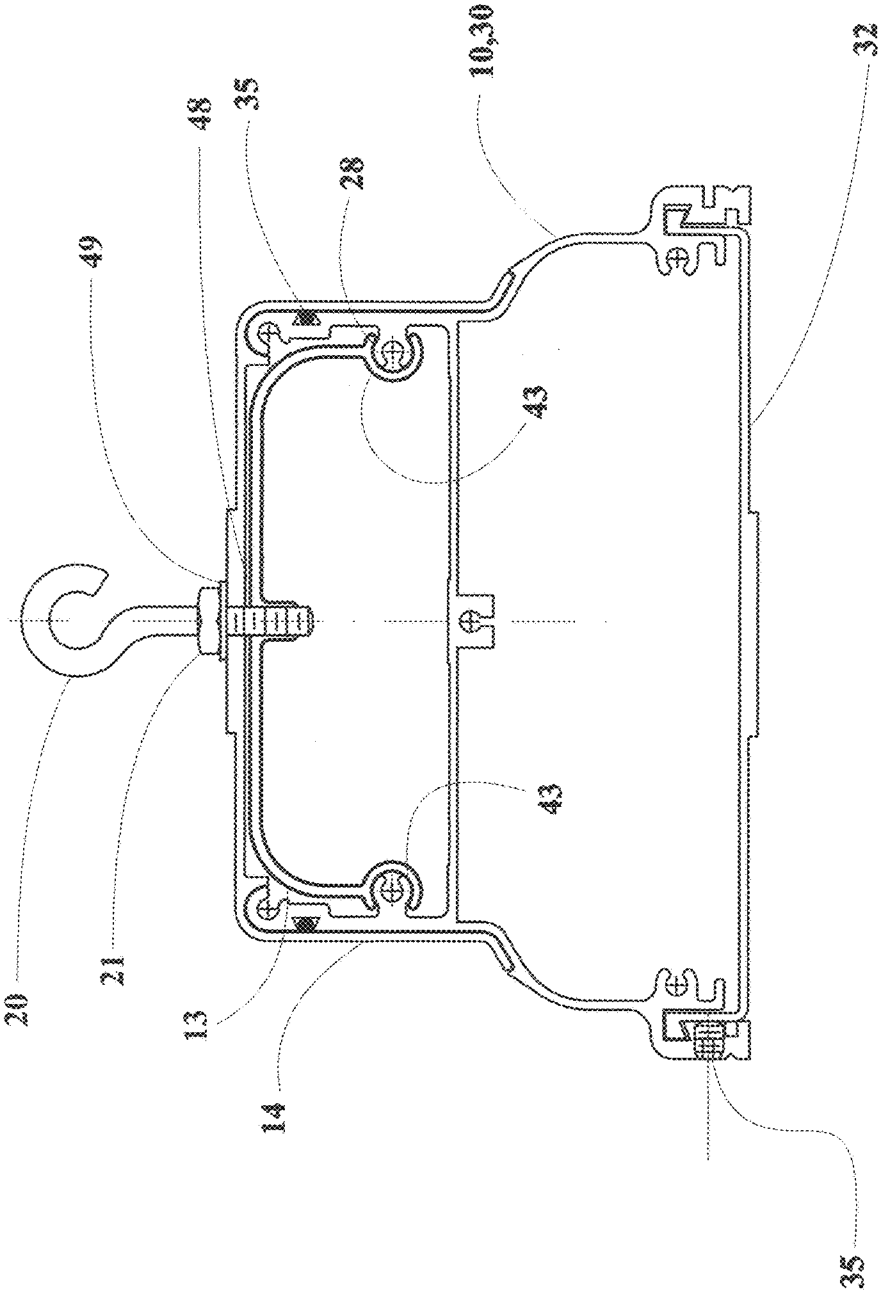
FIG. 25 is a cross-sectional view taken at the hanging hook.

An assembly bridge 13 is inserted at each end of the luminaire prior to final assembly as shown on FIG. 24. The bridge 13 may be formed of extruded aluminum and includes axial channels 28 that ride on complementary axially-extending rails 43 designed into the extrusion profile. The assembly bridge 13 provides a fastening point for a support assembly comprising, e.g., a chain, rope, cable, or the like 18, a fastener such as a hook 19, and an eye bolt 20 having a first end for connection to the fastener 19 and a second end passing through a cover 14 and the assembly bridge 13. A nut 21 secures the cover 14 to the reflector hood 10. An optional light diffuser panel 16 (see FIG. 22) may be slid into opposing axial channels the reflector hood 10 prior to securing the end plates 11.

FIG. 18 illustrates similar luminaire configuration wherein the reflector (30) is configured to receive the LED flex light source (31) with all else being the same as for the tube configuration.

Figure 19:
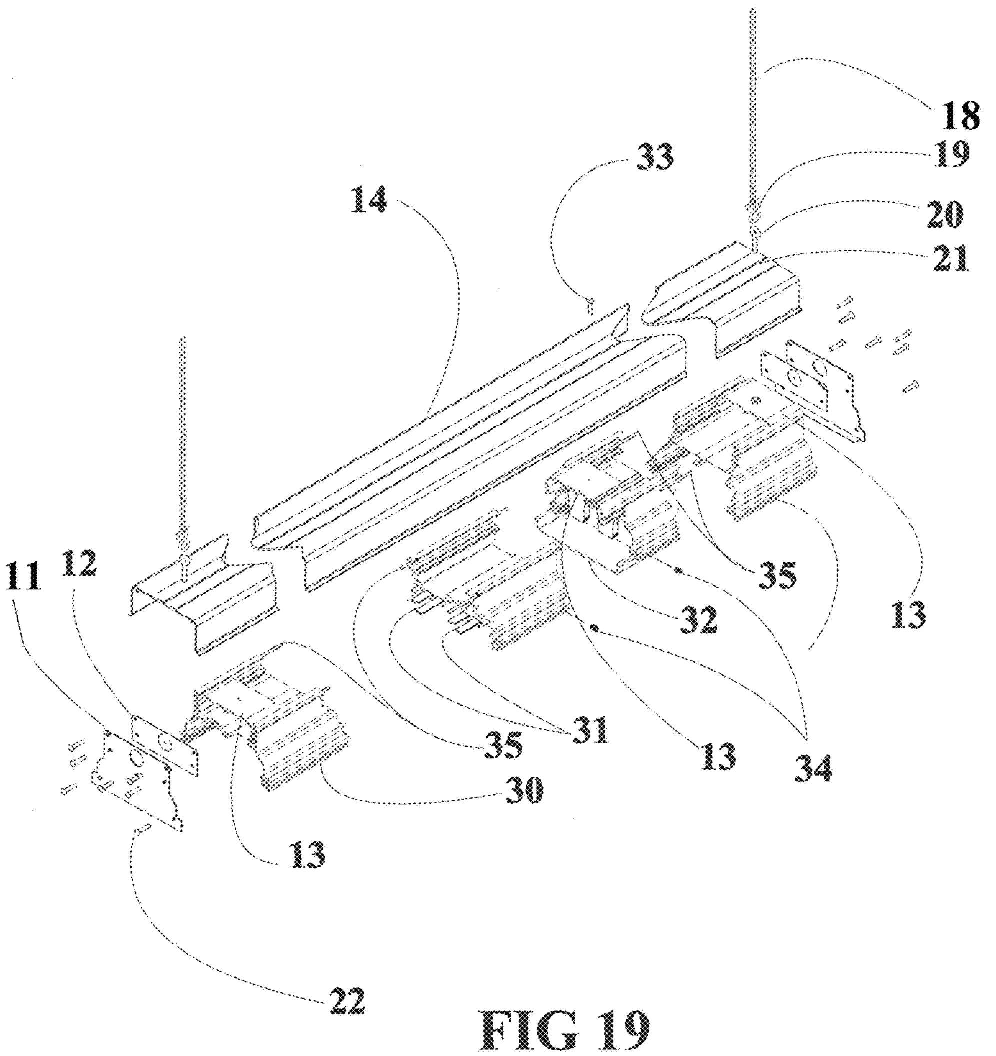
FIG. 19 is an assembly view of the embodiment appearing in FIG. 18.

FIG. 19 illustrates the manner of assembling multiple luminaires end-to-end to provide in a linear track. FIG. 24 shows the cross section at the connection plane. A short length of an extruded connector bridge 32 is assembled with approximately half of its length in each of the two adjoining modules and is secured in position with set screws 35. A short length of the assembly bridge 13 is likewise located approximately 50% of its length in each of the adjacent modules and is secured using a screw 33 and nut 49. Parts are dimensioned such that a small clearance 48 between the cover 14 and the assembly bridge 13 permits the assembly to be drawn together thus securing the connection, e.g., by providing off axial forces between the bridge channels 28 and the rails 43. A result of this design configuration is that all the fixture weight is transferred to the extruded metal cover 14, thus minimizing the effects of long term dimensional creep which otherwise may manifest itself in sagging which may be experienced with a total plastic design.

The extrusion of the reflector hood (10, 30) represents the heart of the design. The outside surface design is identical for the two configurations which permit them to be assembled in a continuous linear array as in FIG. 19. The upper portion of the reflector hood extrusion (10, 30) defines an enclosure volume 45 for the electrical components. A plurality of screw slots 42 provides a means to fasten the end plates 11 to the luminaires. In addition, the rails 43 provide a means to assemble the cover 14 and assemble adjoining luminaires as shown in FIG. 19. A linear seal groove 36 optionally receives a linear seal 35 to provide a sealing interference between the upstanding walls of the reflector hood defining the enclosure volume 45 and the cover 14 to prevent entry of moisture and external contaminants. An enlarged view of the end plate 11 appears in FIG. 26.

Figure 20:
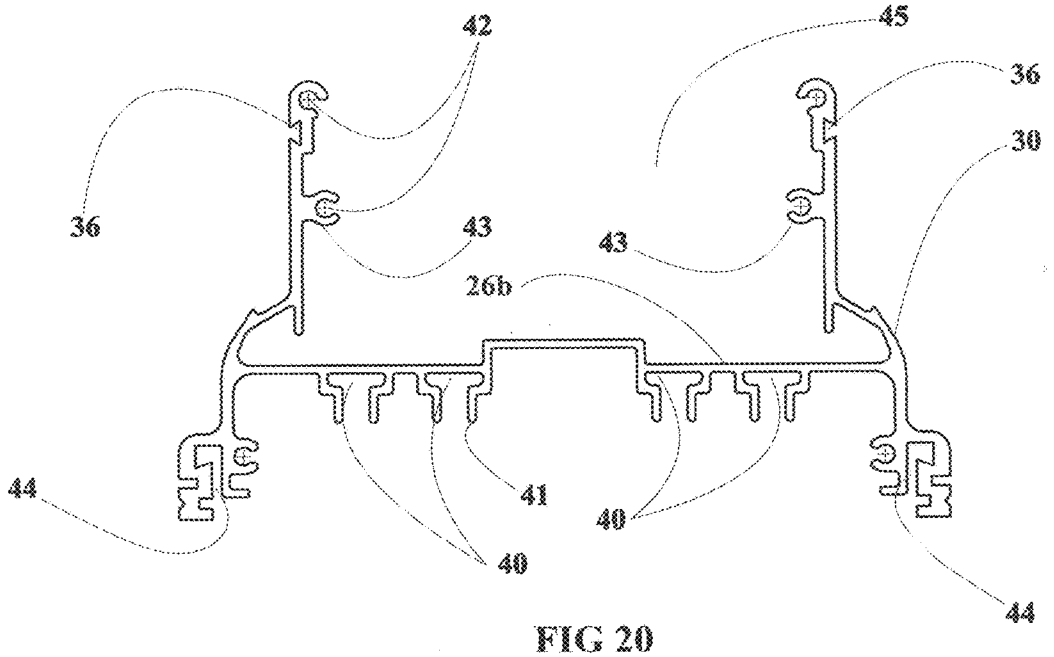
FIG. 20 is a cross-sectional view of the flex strip reflector hood.
Figure 21:
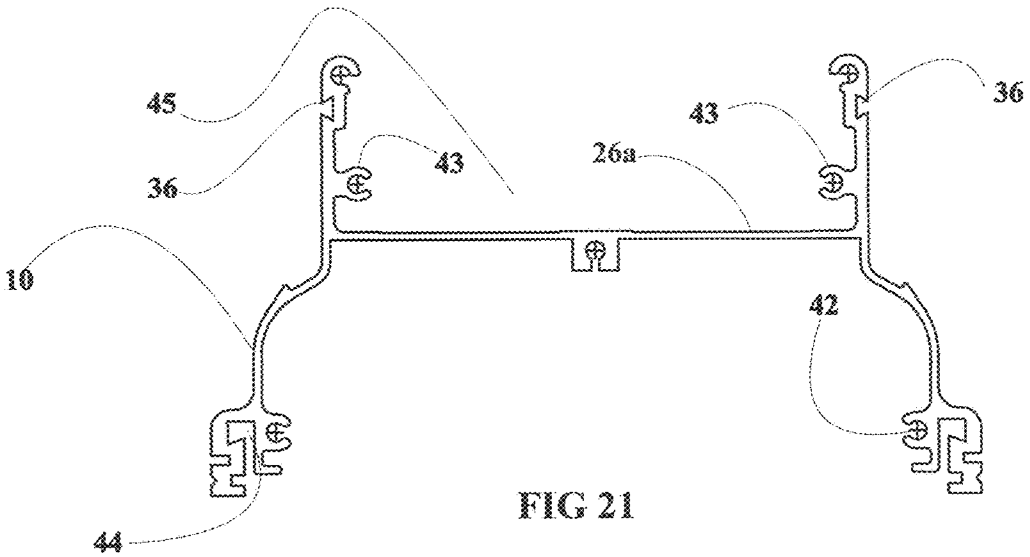
FIG. 21 is a cross-sectional view of the LED tube reflector hood.
Figure 22:
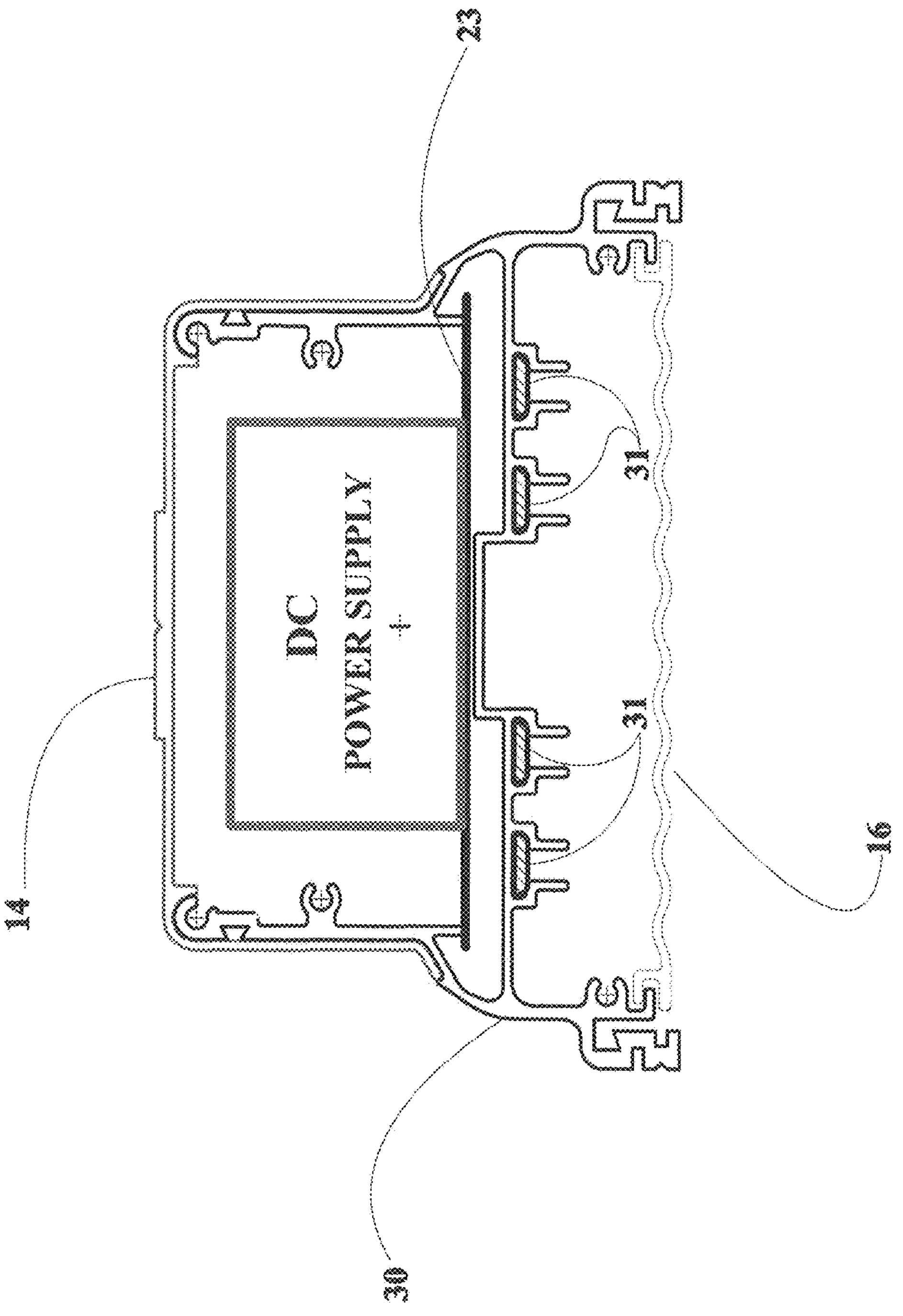
FIG. 22 is a cross-sectional view of the LED flex strip luminaire.
Figure 23:
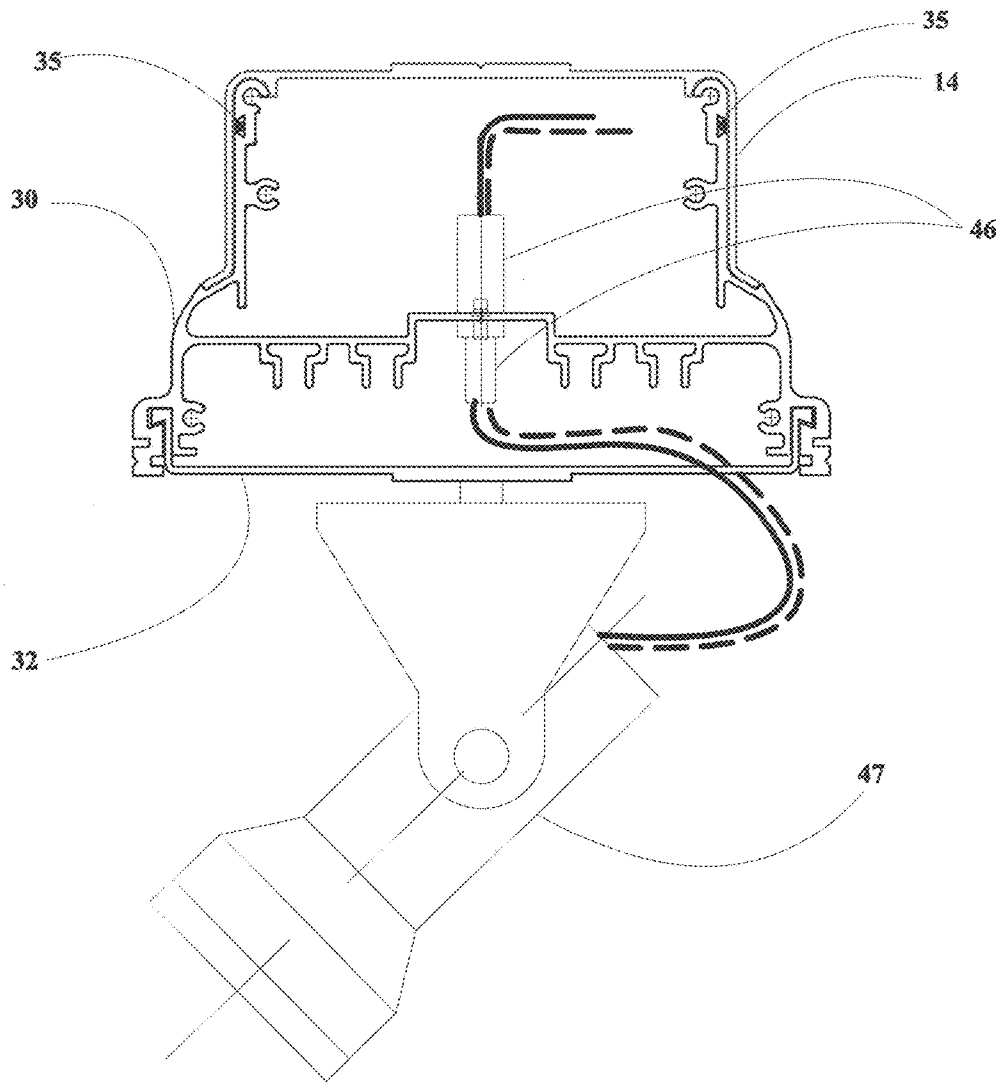
FIG. 23 is a cross-sectional view of the luminaire herein configured for a mounting a lighting component such as a spotlight.

FIG. 20 illustrates the flex strip reflector hood 30 and features four flex strip cavities 40 formed on the lower surface of the transverse web 26*b*. Each cavity 40 is defines a channel having extender fins to generally define a T-shape. The fins serve a dual function, namely, to limit off-axis or stray light and to improve heat transfer. Both the reflector hood 30 and the reflector hood 10 (FIG. 21) feature slots for supporting the assembly bridge 13 which is used for end-to-end luminaire connections as shown in FIG. 19, and also to serve as a mounting platform for accessory equipment to be supported on the luminaire, such as the spotlight 47 as shown in FIG. 23. Alternatively, other types of light fixtures or electrical or electromechanical devices as described above may be secured to the connector bridge 32.

FIG. 19 illustrates an optional method of sealing the electronics enclosure volume 45, which is highly advantageous for certain applications, such as agricultural greenhouse installations. The combination of the linear seals 35 as described above and gaskets 12 configured to provide a seal between the end plate 11 and the end of the reflector hood 10, 30 results in a complete seal of the electronics volume 45. The seals 35 and gasket 12 may be formed of a natural or synthetic rubber or other resilient polymer, e.g., elastomeric material. Alternatively, the gasket 12 may be omitted and the inside face of the end plate may be coated with an elastomer to provide a seal between the end plate and the end of the reflector hood.

Figure 26:
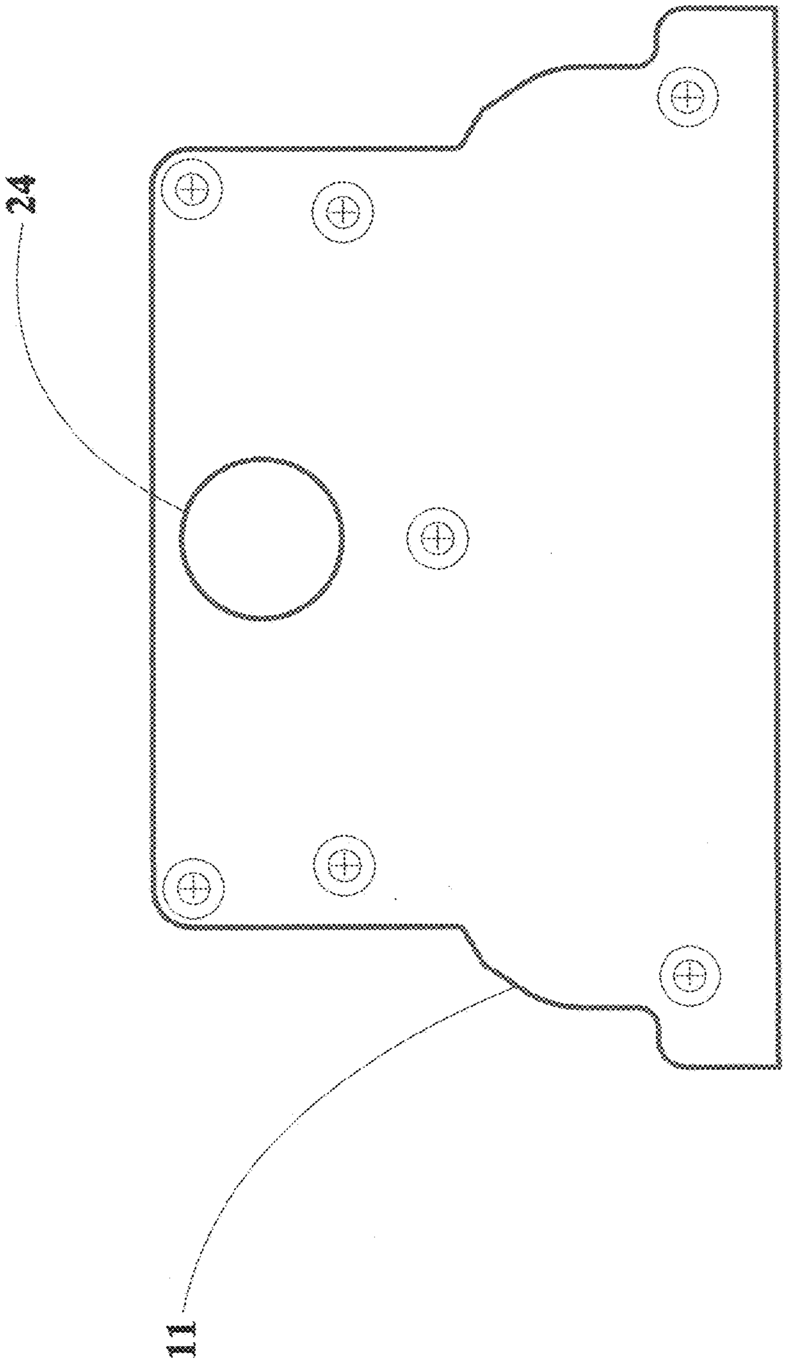
FIG. 26 is an enlarged view of the end plate.

Electrical components within the luminaire systems herein may be designed for multiple voltages, typically 90-277 volts. Certificating labs, therefore, may require special purpose connectors to prevent consumer electrical devices designed for a specific voltage to be accidentally plugged into this system. FIGS. 27*a*-27*f* show exemplary electrical connection hardware for the luminaires. In certain embodiments, each luminaire may be wired independently with male and female connectors, one each at opposite end. Panel connectors also serve as a connection point for external devices, such as the lighting component 47 shown in FIG. 23. As shown in FIG. 26, an opening 24 is formed in the end plate 11 to allow electrical wiring to pass therethrough. In certain embodiments, the opening 24 is dimensioned to accept a hollow threaded bushing with lock nuts to mechanically secure adjacent luminaires together and permit passage of electrical wiring between adjacent luminaires.

Figures 27A, 27B:
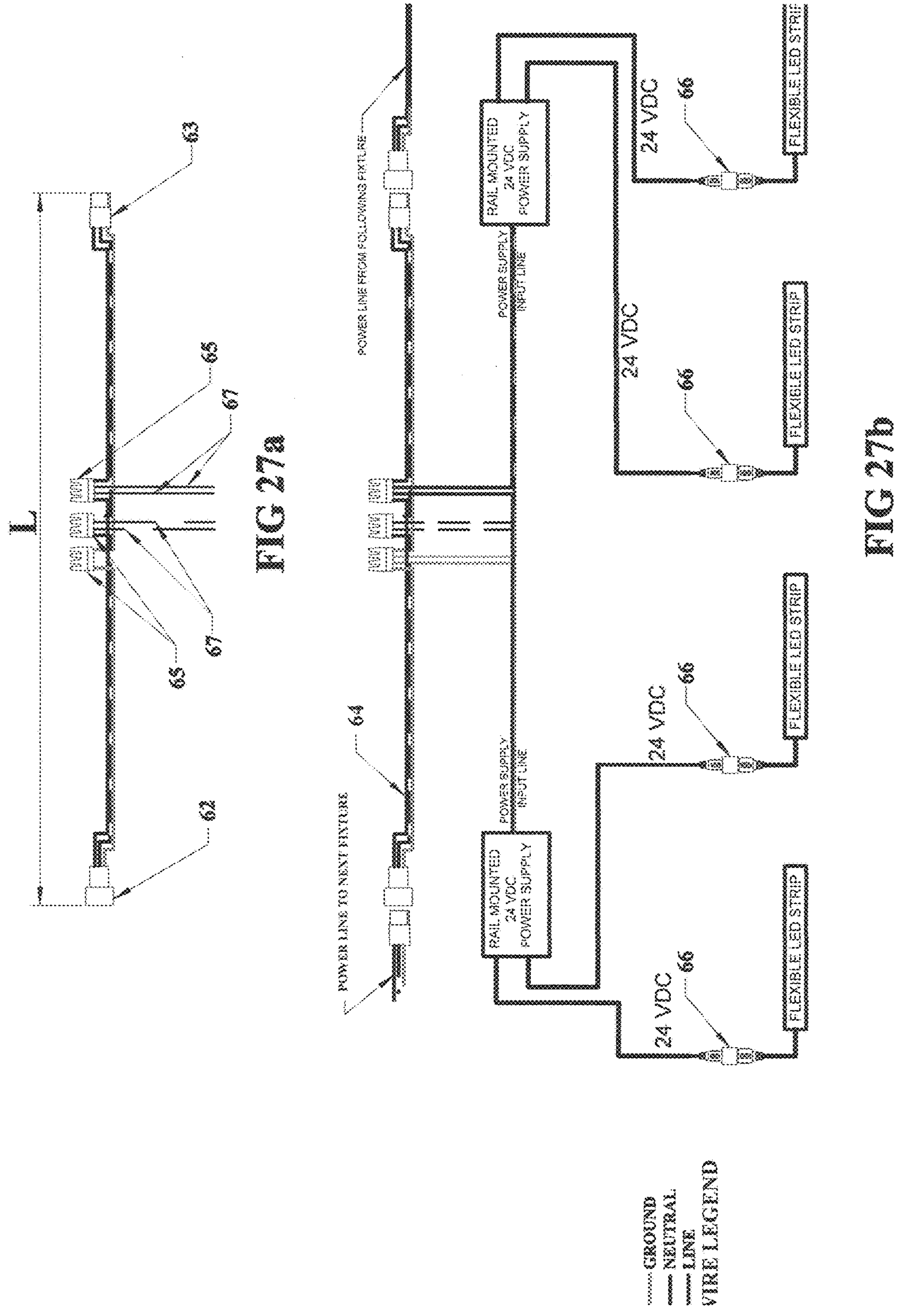
FIG. 27*a* illustrates an exemplary common electrical harness which may be employed in the luminaires of the present disclosure.
FIG. 27*b* is an exemplary wiring schematic for luminaire embodiments employing flex strip lighting elements.

In certain embodiments, the electrical wiring for the lighting system uses a common design harness assembly 64 as illustrated in FIG. 27*a*. The length of the harness L is approximately the length of the luminaire, which permits the end user to interconnect adjacent luminaires simply by plugging them together with 3-pin connector plugs 62 and 63. Power for components may be accessed by connecting branch lines 67 to the main power line with push-in wire connectors 65.

Figure 27C:
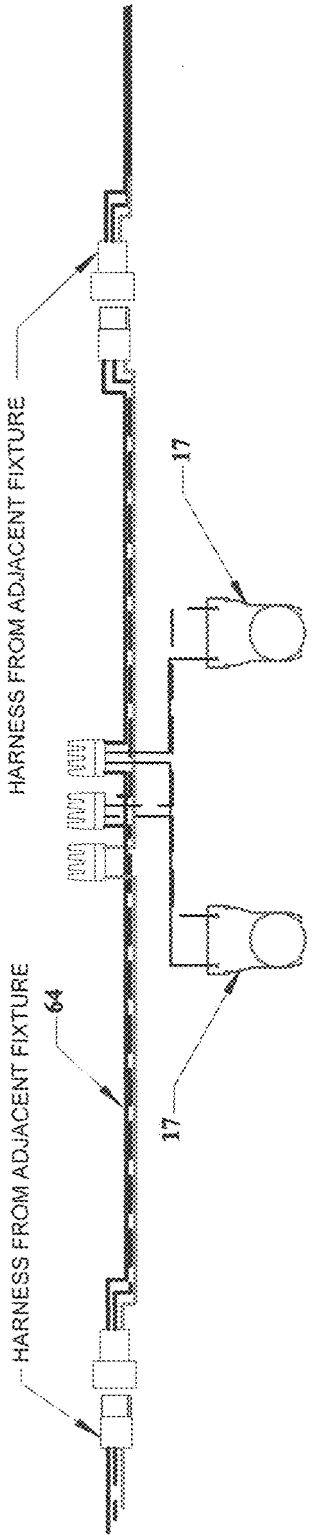
FIG. 27*c* is an exemplary wiring schematic for luminaire embodiments employing LED tube lighting elements.
Figure 27D:
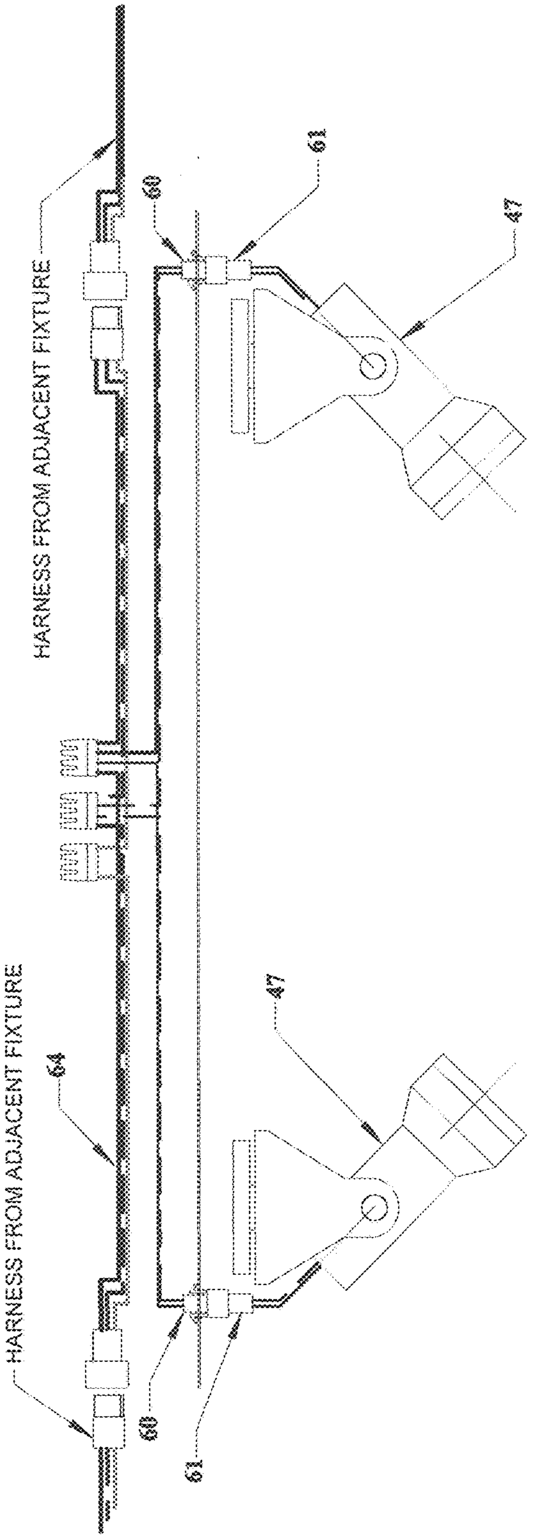
FIG. 27*d* is an exemplary wiring schematic for embodiments herein employing component lighting elements or other electrically operated components
Figure 27E:
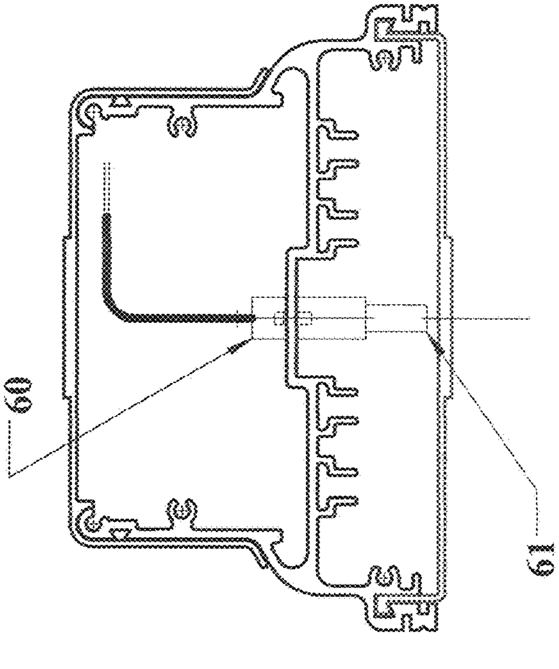
FIG. 27*e* is an end view of an exemplary component mounting embodiment with wiring.
Figure 27F:
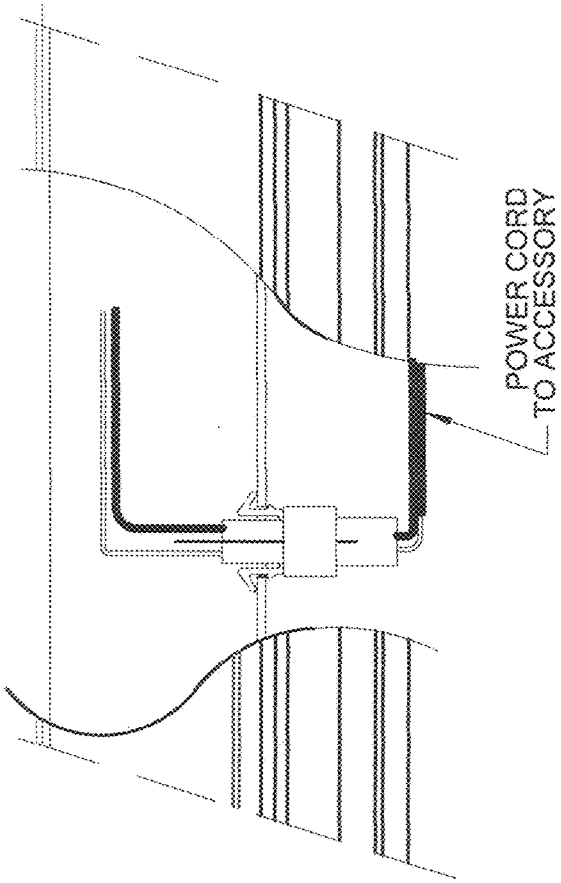
FIG. 27*f* is a fragmentary side view of the embodiment appearing in FIG. 27*e*.

FIG. 27*b* illustrates the wiring connection for the flex strip mode using the common harness 64. Input power to the DC power supply is obtained thru the push-in connectors 65. FIG. 27*c* illustrates the harness 64 wired to the LED tube connectors 17. FIG. 27*d* illustrates the harness connected to the electrical components of the track system. Power is transferred from the electrical enclosure to the outside using panel mount female connector 60 and a male plug 61. FIGS.

27*d* and 27*e* illustrate two views of an exemplary wiring feed thru embodiment as it applies to the spotlight installation.

Figure 28:
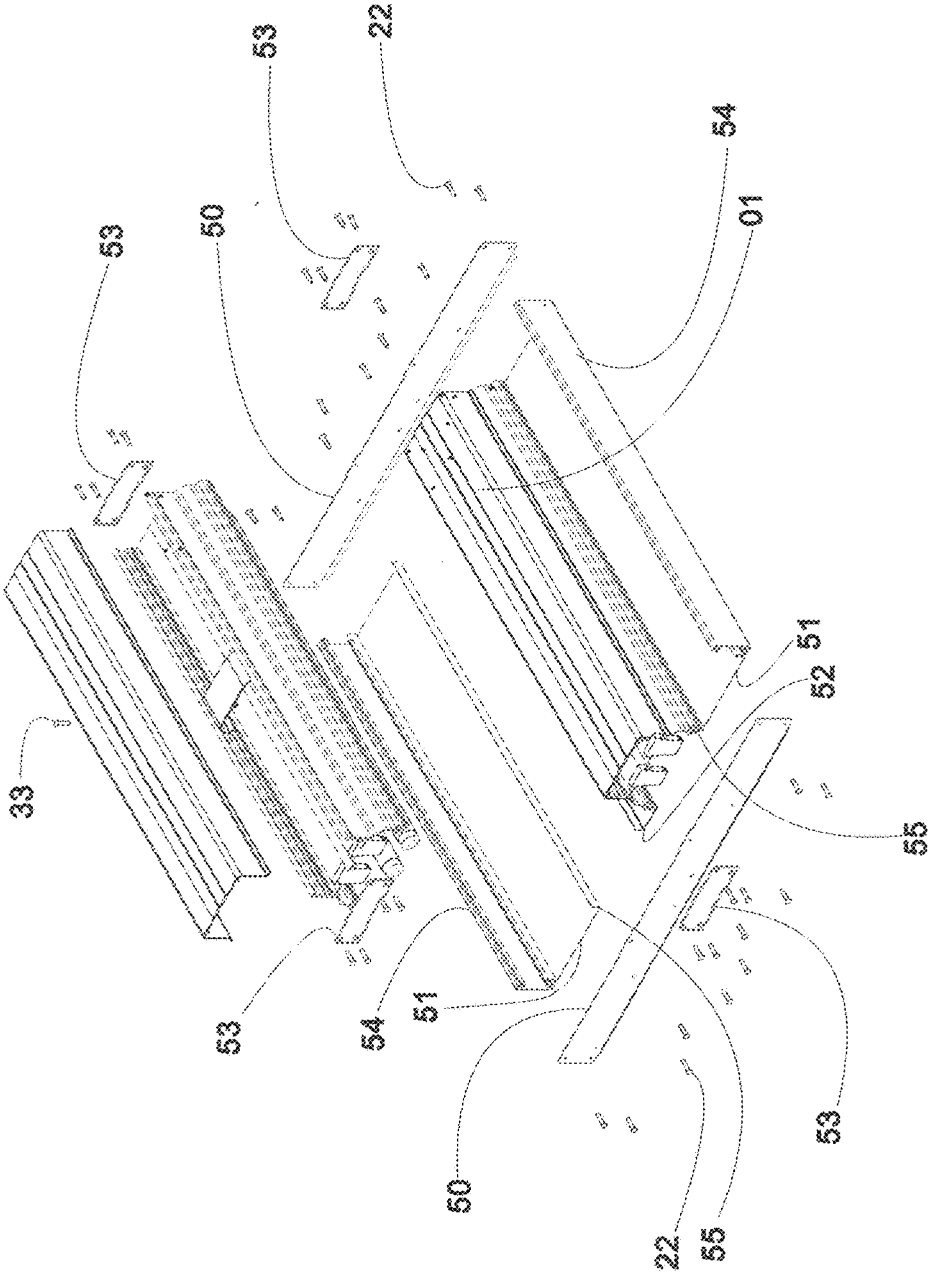
FIG. 28 is an exemplary luminaire embodiment for ceiling grid.

Luminaires described herein may also be configured to be arranged parallel to each other, e.g., in a square or rectangular frame with its outer dimensions corresponding to those required for installation in a 2'×2' or 2'×4' grid ceiling. FIG. 28 illustrates an assembly with two luminaires however; an assembly with one or three or other numbers of luminaires is possible for the above applications. The same luminaire assemblies 01 used for the linear track fixture assembly as described above are used for the grid ceiling assembly. The mounting tray assembly is comprised of two end plates 50, left and right filler plates 51 and center filler plate 52, and two outside assembly bars 54. Other arrangements of filler plates are used when other numbers of luminaire assemblies 01 are employed in the panel. These structural parts may be fabricated from aluminum or plastic using spot welding or bonding to complete the tray assembly. The luminaires are then assembled to the tray being positioned with the return bends 55 mating with the reflector hood slots 44 (see FIGS. 20 and 21). The assembly is completed using screws 22 to secure the luminaires to the tray and fastening the electrical end plate 53.

In certain embodiments, a modular luminaire track lighting system includes interconnecting luminaire modules designed to accommodate various lighting functions by alternative mechanical designs of the lighting module's component mounting structure.

In certain embodiments, a modular luminaire track lighting system of claim includes a luminaire fabricated from a plastic or aluminum extrusion having the electrical wiring enclosure integrated with the lighting device mounting structure in a single extrusion.

In certain embodiments, a modular luminaire track lighting system includes an extrusion designed with screw fastening slots with the slot's outer surface serving as a gripping edge for a load transfer bridge.

In certain embodiments, a modular luminaire track lighting system includes a load transfer bridge designed to interface the track system to provide a mounting block for the screws to fasten the electrical wiring enclosure cover.

In certain embodiments, a modular luminaire track lighting system includes an extrusion designed with dovetail slots interfacing with an extruded connector bridge plate for the purpose of aligning two adjacent luminaires end to end resulting in a linear assembly of connected luminaires.

In certain embodiments, a modular luminaire track lighting system of includes an extruded luminaire structure designed with tabs located to provide a location suitable for a set screw to secure the axial location of the connector bridge/load transfer bridge.

In certain embodiments, a modular luminaire track lighting system of uses additional connector bridge plates and the extruded dovetail as a means to mount lighting components resulting in a track lighting system.

In certain embodiments, a modular luminaire track lighting system includes an extrusion having a flat web area to provide a surface for panel mounted connectors to provide electric power to track mounted components.

In certain embodiments, a modular luminaire track lighting system includes one or more parallel slots dimensioned to capture flexible LED strips.

In certain embodiments, a modular luminaire track lighting system having parallel slots dimensioned to capture flexible LED strips further includes extender fins for heat transfer and optical considerations.

In certain embodiments, a modular luminaire track lighting system includes end mounting plates fastened to the luminaire extrusion's screw slots with self-tapping screws. The end panel is provided with a hole dimensioned to accept a hollow threaded bushing with lock nuts to mechanically secure adjacent luminaires together and permit passage of electrical wiring between adjacent luminaires.

In certain embodiments, a modular luminaire track lighting system includes grooves on the sidewalls of the extrusion to accommodate a linear sealing gasket to complete a dust and moisture seal between the electrical wiring enclosure and a cover.

In certain embodiments, a modular luminaire track lighting system includes end mounting plates having an elastomer-coated inside face to complete the seal of the electrical wiring enclosure.

In certain embodiments, a modular lighting system includes a harness designed with one male plug connector and one female plug connector at the ends, with the length of the harness being approximately the length of the module such as to permit interconnecting adjacent modules with the male plug connector of one luminaire module and the female plug connector of an adjacent luminaire module.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A modular lighting system comprising:

a plurality of extended reflector hoods, each of said extended reflector hoods having first and second longitudinal sides and a web extending between the first and second longitudinal sides, the web having an upper web surface and a lower web surface;

the upper web surface cooperating with the first and second longitudinal sides to define an upper channel having an open top and the lower web surface cooperating with the first and second longitudinal sides to define a lower channel having an open bottom;

at least one assembly bridge having a generally inverted U-shaped cross-sectional shape and sized to be received within the upper channel, each of said at least one assembly bridge comprising a first vertical portion, the first vertical portion having a first channel slidably receiving a first longitudinal rail formed on an inward facing surface of the first longitudinal side, a second vertical portion, the second vertical portion having a second channel slidably receiving a second longitudinal rail formed on an inward facing surface of the second longitudinal side, and a transverse portion extending between the first vertical portion and the second vertical portion;

an extended cover having a generally inverted U-shaped cross-sectional shape, said extended cover comprising a first vertical portion slidably receivable over the first longitudinal side, a second vertical portion slidably receivable over the second longitudinal side, and a transverse portion extending between the first vertical portion and the second vertical portion to at least partially enclose the open top of the plurality of extended reflector hoods.

2. The modular lighting system of claim 1 wherein:

a first one of the plurality of extended reflector hoods and a second one of the plurality of extended reflector hoods are arranged end to end; and one of the at least one assembly bridges retaining adjacent ends of said first one of the plurality of extended reflector hoods and said second one of the plurality of extended reflector hoods.

3. The modular lighting system of claim 1, further comprising:

a first groove formed in an outward facing surface of the first longitudinal side;

second groove formed in an outward facing surface of the second longitudinal side;

a first linear seal in received in the first groove to provide a sealing interference between the first longitudinal side and the cover; and a second linear seal received in the second groove to provide a sealing interference between the second longitudinal side and the cover.

4. The modular lighting system of claim 1, further comprising one or more fasteners for suspending the lighting system from an overhead structure.

5. The modular lighting system of claim 1, wherein each of said plurality of extended reflector hoods include opposing longitudinal channels for slidably receiving an extended diffuser panel configured to at least partially close the open bottom of the lower channel.

6. The modular lighting system of claim 1, further comprising a fastener for securing the transverse portion of the cover to the transverse portion of the assembly bridge.

7. The modular lighting system of claim 6, further comprising a clearance between the transverse portion of the cover and the transverse portion of the assembly bridge.

8. The modular lighting system of claim 1, wherein at least one of the extended reflector hoods includes means configured for mounting one or more for LED tube lamps.

9. The modular lighting system of claim 8, further comprising a plurality of tube lamp sockets secured to the web.

10. The modular lighting system of claim 1, further comprising:

a connector bridge having opposing longitudinal sides and a transverse portion extending between the opposing longitudinal sides;

each of said plurality of extended reflector hoods include opposing longitudinal channels slidably receiving the opposing longitudinal sides, the transverse portion configured to at least partially close the open bottom of the lower channel.

11. The modular lighting system of claim 10, further comprising:

an electrical component secured to the connector bridge.

12. The modular lighting system of claim 11, wherein said electrical component is selected from the group consisting of a light fixture and an electromechanical device.

13. The modular lighting system of claim 1, wherein at least one of the extended reflector hoods includes means configured for mounting one or more LED strips.

14. The modular lighting system of claim 13, further comprising:

one or more LED strips; and a power supply received within the upper channel and electrically coupled to the one or more LED strips.

15. The modular lighting system of claim 13, further comprising one or more longitudinal channels on the web lower surface for receiving the one or more LED strips.

16. The modular lighting system of claim 15, further comprising longitudinally extending fins attached to the longitudinal channels.

17. The modular lighting system of claim 1, further comprising:

one or more longitudinal fastener channels formed on an inward facing surface of the first longitudinal side for receiving one or more threaded fasteners; and one or more longitudinal fastener channels formed on an inward facing surface of the second longitudinal side for receiving one or more threaded fasteners.

18. The modular lighting system of claim 17, further comprising one or more longitudinal fastener channels formed on the web for receiving one or more threaded fasteners.

19. The modular lighting system of claim 17, further comprising an end plate configured to be secured to an end of one of the extended reflector hoods, the end plate having one or more openings aligned with said one or more longitudinal fastener channels formed on an inward facing surface of the first longitudinal side, and one or more longitudinal fastener channels formed on an inward facing surface of the second longitudinal side.

20. The modular lighting system of claim 19, further comprising a gasket formed of a resilient material disposed between the end plate and said one of the extended reflector hoods to provide a sealing interference therebetween.

21. The modular lighting system of claim 19, further comprising one or more longitudinal fastener channels formed on the web.

22. A light fixture for mounting in a suspended ceiling grid, the suspended ceiling grid being of a type having a first plurality of frame members extending in a first direction and a second plurality of frame members extending in a second direction perpendicular to the first direction, the first plurality of frame members and the second plurality of frame members cooperating to define a plurality of rectangular openings above an area to be illuminated, each of the rectangular openings having a inwardly-extending peripheral lip, the light fixture comprising:

a mounting tray defining a rectangle dimensioned to be received within one of the rectangular openings and supported on the peripheral lip, the mounting tray including first and second longitudinally extending, spaced apart assembly bars and first and second spaced apart transversely extending end plates extending between the first and second assembly bars, said first and second assembly bars and said first and second end plates cooperating to define a rectangular tray opening;

one or more extended reflector hoods, each having first and second longitudinal sides and a web extending between the first and second longitudinal sides, the web having an upper web surface and a lower web surface, the upper web surface cooperating with the first and second longitudinal sides to define an upper channel having an open top and the lower web surface cooperating with the first and second longitudinal sides to define a lower channel having an open bottom;

an extended cover having a generally inverted U-shaped cross-sectional shape, said extended cover comprising a first vertical portion slidably receivable over the first longitudinal side, a second vertical portion slidably receivable over the second longitudinal side, and a transverse portion extending between the first vertical portion and the second vertical portion to at least partially enclose the open top of the extended reflector hood;

a first filler plate received within the rectangular tray opening and having a first longitudinal edge attached to the first assembly bar and a second longitudinal edge slidably received within a complimentary longitudinal channel formed in one of the first and second longitudinal sides of one of the one or more extended reflector hoods; and a second filler plate received within the rectangular tray opening and having a first longitudinal edge attached to the second assembly bar and a second longitudinal edge slidably received within a complimentary longitudinal channel formed in another one of the first and second longitudinal sides of one of the one or more extended reflector hoods.

23. The light fixture of claim 22, comprising first and second extended reflector hoods and further comprising a third filler plate disposed between the first and second extended reflector hoods, the third filler plate having a first longitudinal edge slidably received within a complimentary longitudinal channel formed in the first extended reflector hood and a second longitudinal edge slidably received within a complimentary longitudinal channel formed in the second extended reflector hood.

* * * * *